(12) United States Patent
Cuzzort et al.

(10) Patent No.: US 10,355,872 B2
(45) Date of Patent: Jul. 16, 2019

(54) TECHNIQUES FOR A COLLABORATION SERVER NETWORK CONNECTION INDICATOR

(71) Applicant: PRYSM, INC., San Jose, CA (US)

(72) Inventors: Adam P. Cuzzort, Westfield, IN (US); Stuart Monks, Pleasanton, CA (US); William Mason Shewman, Noblesville, IN (US)

(73) Assignee: PRYSM, INC, San Jose, CA (US)

( * ) Notice: Subject to any disclaimer, the term of this patent is extended or adjusted under 35 U.S.C. 154(b) by 148 days.

(21) Appl. No.: 15/424,740

(22) Filed: Feb. 3, 2017

(65) Prior Publication Data
US 2017/0230191 A1 Aug. 10, 2017

Related U.S. Application Data

(60) Provisional application No. 62/292,181, filed on Feb. 5, 2016.

(51) Int. Cl.
*H04L 12/18* (2006.01)
*H04L 12/26* (2006.01)
*H04L 29/06* (2006.01)
*H04L 29/08* (2006.01)

(52) U.S. Cl.
CPC .......... *H04L 12/1827* (2013.01); *H04L 43/08* (2013.01); *H04L 67/125* (2013.01); *H04L 67/14* (2013.01); *H04L 67/18* (2013.01); *H04L 67/42* (2013.01)

(58) Field of Classification Search
CPC ............. H04L 12/1822; H04L 12/1827; H04L 67/104; H04L 67/2823; H04L 67/28; H04L 67/2814

USPC ........ 709/204, 205, 224, 225, 227; 715/759, 715/738

See application file for complete search history.

(56) References Cited

U.S. PATENT DOCUMENTS

| | | | |
|---|---|---|---|
| 8,762,548 B1* | 6/2014 | Kessel | H04W 48/18 709/219 |
| 9,313,098 B1* | 4/2016 | Lazarescu | H04L 41/0806 |
| 2005/0220035 A1* | 10/2005 | Ling | H04L 41/147 370/252 |
| 2008/0114844 A1* | 5/2008 | Sanchez | G06F 9/543 709/206 |

(Continued)

*Primary Examiner* — Ranodhi Serrao
*Assistant Examiner* — James N Fiorillo
(74) *Attorney, Agent, or Firm* — Artegis Law Group, LLP

(57) ABSTRACT

A collaboration server transmits a server data structure to each client in a collaboration session for a shared workspace. The server data structure specifies a plurality of network connection metrics and a plurality of corresponding weights. Each client receives the plurality of metrics and weights and determines various values (such as a measured value, normalized value, and/or weighted value) for each metric. Each client also calculates an overall connection value based on a plurality of weighted values determined for the plurality of metrics. Each client generates and displays a connection indicator based on the overall connection value which represents an overall quality of a network connection between the client and the collaboration server. Each client also receives a remote overall connection value corresponding to a remote client and generates and displays a remote connection indicator based on the remote overall connection value.

15 Claims, 14 Drawing Sheets

(56) References Cited

U.S. PATENT DOCUMENTS

| | | | | |
|---|---|---|---|---|
| 2008/0189724 A1* | 8/2008 | Tien | ...................... | G06Q 10/10 719/329 |
| 2012/0324365 A1* | 12/2012 | Momchilov | .............. | G06F 3/14 715/738 |
| 2013/0028088 A1* | 1/2013 | Do | ....................... | H04L 1/0002 370/235 |
| 2013/0067121 A1* | 3/2013 | Beel | ..................... | H04M 3/567 710/20 |
| 2013/0196685 A1* | 8/2013 | Griff | .................... | H04L 43/067 455/456.1 |
| 2014/0179238 A1* | 6/2014 | Wynn | ................. | H04L 41/5067 455/67.11 |
| 2014/0306837 A1* | 10/2014 | Hauck, III | .............. | B63B 9/001 340/984 |
| 2014/0317172 A1* | 10/2014 | Granshaw | ........... | H04L 67/1008 709/203 |
| 2014/0321294 A1* | 10/2014 | Nagel | ..................... | H04L 43/08 370/252 |
| 2015/0131458 A1* | 5/2015 | Scharf | ................... | H04L 45/123 370/252 |
| 2015/0149609 A1* | 5/2015 | Zou | ...................... | H04L 67/2833 709/224 |
| 2015/0358577 A1* | 12/2015 | Zhou | ....................... | H04L 51/10 348/14.01 |
| 2016/0062866 A1* | 3/2016 | Shurtleff | ............. | G06F 11/3065 702/186 |
| 2016/0134428 A1* | 5/2016 | Ouyang | .............. | H04L 12/1822 709/204 |
| 2016/0232800 A1* | 8/2016 | Heenan | .................... | G09B 7/00 |
| 2016/0234268 A1* | 8/2016 | Ouyang | .................. | H04L 65/403 |
| 2017/0086084 A1* | 3/2017 | Jarvis | .................... | H04W 24/06 |
| 2017/0257290 A1* | 9/2017 | Ogielski | ................. | H04L 41/00 |
| 2018/0084015 A1* | 3/2018 | Gupta | ................ | H04L 65/1086 |

* cited by examiner

| Metric 630 | Weight 640 | Client ID 650 | Overall Connection Value 660 |
|---|---|---|---|
| A | W1 | ClientID1 | OV1 |
| B | W2 | ClientID2 | OV2 |
| C | W3 | ClientID3 | OV3 |
| D | W4 | ClientID4 | OV4 |
| ... | | | |

FIG. 6

| Metric 630 | Weight 640 | Measured Value 745 | Normalized Value 750 | Weighted Value 755 | Overall Connection Value 660 |
|---|---|---|---|---|---|
| A | W1 | MV1 | NV1 | WV1 | OV1 |
| B | W2 | MV2 | NV2 | WV2 | |
| C | W3 | MV3 | NV3 | WV3 | |
| D | W4 | MV4 | NV4 | WV4 | |
| ... | | | | | |

FIG. 7

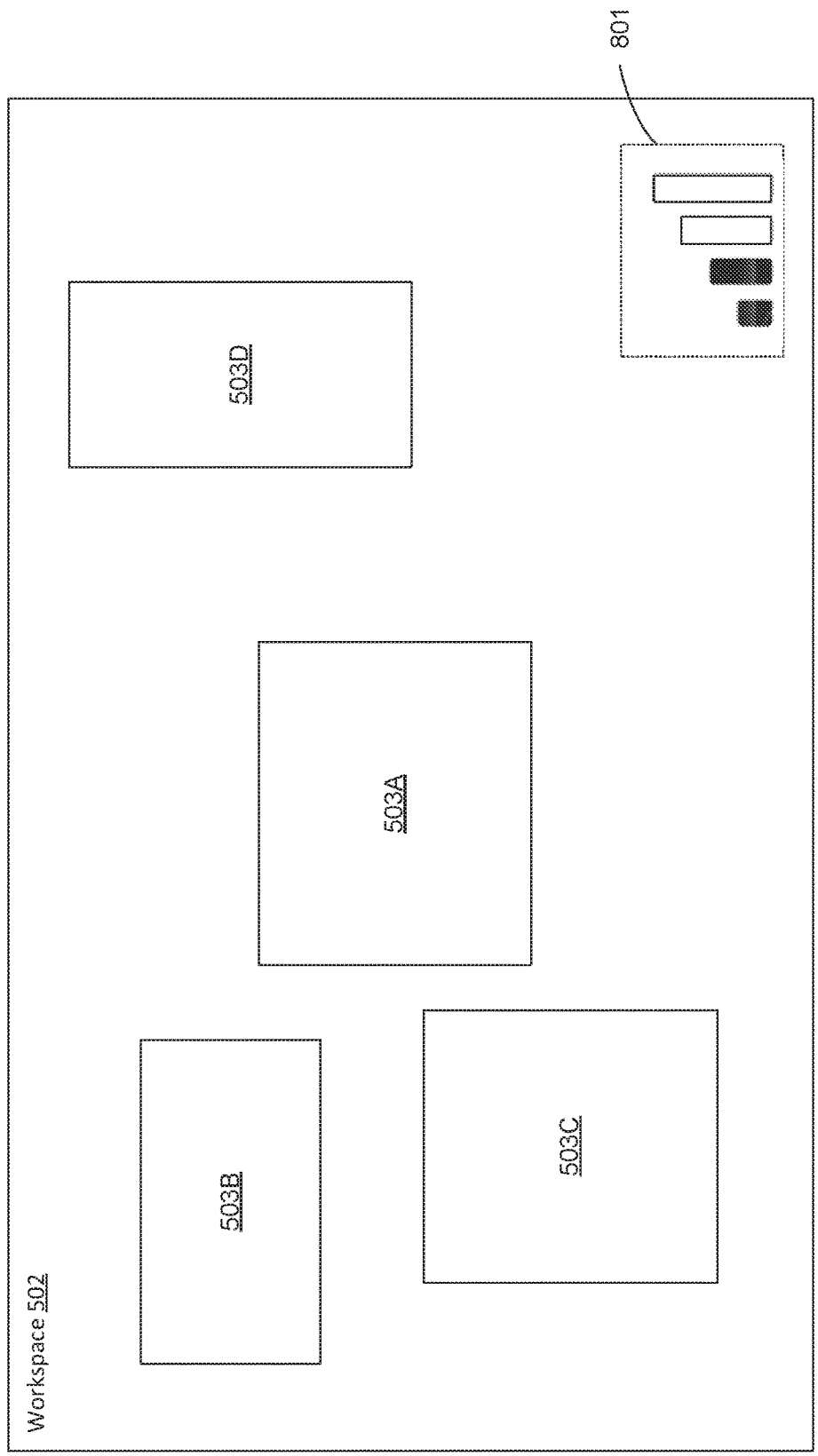

TECHNIQUES FOR A COLLABORATION SERVER NETWORK CONNECTION INDICATOR

CROSS-REFERENCE TO RELATED APPLICATIONS

This application claims the benefit of United States provisional patent application titled "TECHNIQUES FOR CLOUD SERVER CONNECTION INDICATOR," filed on Feb. 5, 2016 and having Ser. No. 62/292,181. The subject matter of this related application is hereby incorporated herein by reference.

BACKGROUND OF THE INVENTION

Field of the Invention

The present invention generally relates to sharing digital content and, more specifically, to techniques for a collaboration server network connection indicator.

Description of the Related Art

Currently, a variant of techniques are implemented to share digital content across different computer devices (client devices), facilitated by a collaboration server. As a general matter, during such content sharing sessions ("collaboration sessions"), a shared workspace that includes various types of digital content ("assets") is simultaneously displayed on multiple client devices at different physical locations via the collaboration server. For example, the shared workspace can be simultaneously displayed on a local client device (used by a local user) as well as one or more remote client devices (used by one or more remote users), where each local and remote client device is connected to the collaboration server via a network connection. Typically, the different participants in a given collaboration session access and use the assets included in the shared workspace during the collaboration session. For example, the various assets may be repositioned or resized during a given collaboration session, and new assets may be added within the shared workspace during the collaboration session. In that regard, when a given user interacts with a particular asset in the shared workspace during a collaboration session, those interactions are reflected or mirrored on each client device participating in the collaboration session and displaying the shared workspace.

During the collaboration session, performance issues may arise that degrade the quality of the collaboration session and overall user experience. Such performance issues may include, for example and without limitation, long latencies, jittering, dropped connections, and other disruptions that reduce the quality of the collaboration session. The cause of such performance issues may reside anywhere within the collaboration system. For example, for a particular client device, the cause of a performance issue may originate from the client device, the collaboration server, or the network connection between the client device and the collaboration server. Accordingly, there is no easy or efficient way for a user to determine the cause of a performance issue that arises during a collaboration session. Without understanding the cause of a given performance issue, a user may attempt to resolve the issue incorrectly. For example, the cause of the performance issues may originate from the network connection, but the user may instead try to reboot the client device, contact the IT department that services the client device, or contact the vendor of the client device in an attempt to resolve the performance issue. Misdirected attempts to resolve performance degradation issues during a collaboration session waste valuable time and are frustrating for users.

In addition, remote participants in a given collaboration session cannot easily convey information to a local participant in the collaboration session about a performance issue that may be related to the local client device used by that local participant or a remote client device used by one of the remote participants. For example, a local user may be giving a presentation to various remote users and not know that one of the remote client devices is experiencing a performance issue and, consequently, may continue with the presentation without waiting for the performance issue to be resolved. As a result, the remote user may miss a portion of the presentation. As a general matter, when performance issues arise during a collaboration session, the participants usually have to discuss those issues verbally or through instant messaging, which disrupts the collaboration session and wastes valuable time.

As the foregoing illustrates, what is needed in the art are more effective techniques for informing participants of possible causes of performance issues that arise during collaboration sessions.

SUMMARY OF THE INVENTION

Various embodiments of the present invention include a computer-implemented method for generating a connection indicator associated with a collaboration session. The method includes retrieving, at a collaboration server, an indicator data structure associated with a shared workspace displayed on a plurality of client devices during the collaboration session. The indicator data structure comprises a plurality of weights for a plurality of network connection metrics, each weight in the plurality of weights corresponding to a different network connection metric in the plurality of network connection metrics. The method further includes transmitting the indicator data structure to a plurality of client devices participating in the collaborative session. Each client device included in the plurality of client devices generates a connection indicator based, at least in part, on the indicator data structure, each connection indicator representing an overall quality of a network connection between the client device and the collaboration server.

At least one advantage of the disclosed technique is that a connection indicator is displayed at each client in a collaboration session that indicates an overall quality of a network connection between the client and the collaboration server. Thus, the connection indicator helps the client determine the cause of performance issues incurred during the collaboration session and to take appropriate actions to resolve the performance issues.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is a conceptual diagram of the server indicator data structure of FIG. 5, according to various embodiments of the present invention;

FIG. 7 is a conceptual diagram of a client indicator data structure of FIG. 5, according to various embodiments of the present invention;

FIG. 8A is a screenshot of a rendering of a shared workspace that includes a first type of local connection indicator, according to various embodiments of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into two sub-sections. Section I is a system overview describing a collaboration system. Section II describes techniques for displaying a network indicator associated with a collaboration session.

System Overview

Figure 1:
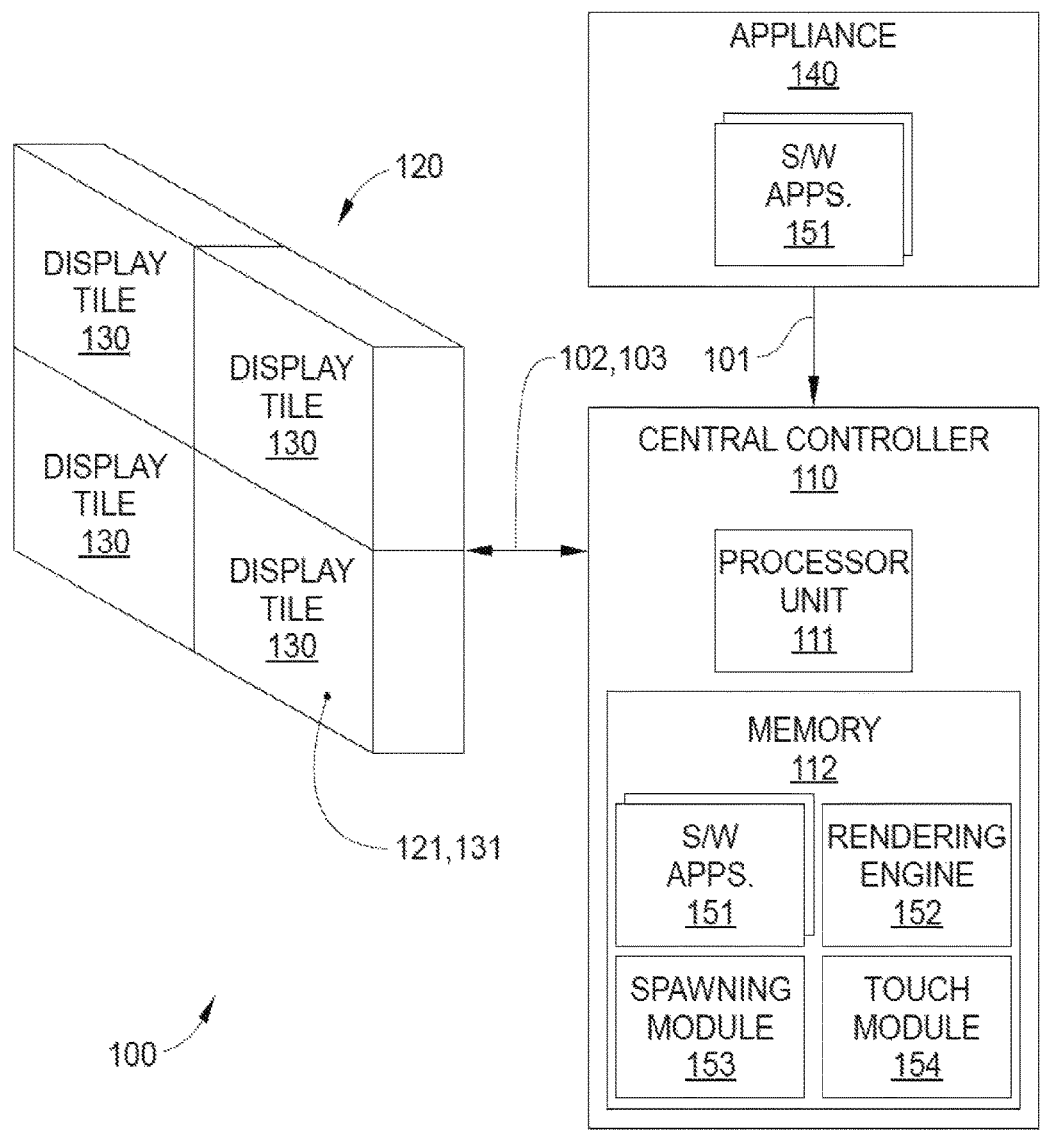
FIG. 1 is a block diagram of a display system configured to implement one or more aspects of the present invention.

FIG. 1 is a block diagram of a display system 100 configured to implement one or more aspects of the present invention. As shown, display system 100 includes, without limitation, a central controller 110, a display 120, and an appliance/client 140. In some embodiments, display 120 is a display wall that includes multiple display tiles. Central controller 110 receives digital image content 101 from the appliance 140 or from an information network or other data routing device, and converts said input into image data signals 102. Thus, digital image content 101 may be generated locally, with appliance 140, or from some other location. For example, when display system 100 is used for remote conferencing, digital image content 101 may be received via any technically feasible communications or information network, wired or wireless, that allows data exchange, such as a wide area network (WAN), a local area network (LAN), a wireless (Wi-Fi) network, and/or the Internet, among others.

Central controller 110 includes a processor unit 111 and memory 112. Processor unit 111 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor unit 111 may be any technically feasible hardware unit capable of processing data and/or executing program code and software applications to facilitate operation of display system 100, including software applications 151, rendering engine 152, spawning module 153, and touch module 154. The processor unit 111 executes software and performs the functions and operations described herein. During operation, software applications 151, rendering engine 152, spawning module 153, and touch module 154 may reside in memory 112. Alternatively or additionally, software applications 151 may also reside in appliance 140. In some embodiments, one or more of 151-154 may be implemented in firmware, either in central controller 110 and/or in other components of display system 100.

Memory 112 may include volatile memory, such as a random access memory (RAM) module, and non-volatile memory, such as a flash memory unit, a read-only memory (ROM), or a magnetic or optical disk drive, or any other type of memory unit or combination thereof. The memory unit 112 is configured to store software application(s) and data. Instructions from the software constructs within the memory unit 112 are executed by processors 111 to enable the inventive operations and functions described herein. Memory 112 is configured to store any software programs, operating system, drivers, and the like, that facilitate operation of display system 100, including software applications 151, rendering engine 152, spawning module 153, and touch module 154.

Display 120 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, display 120 includes a plurality of display light engine and screen tiles 130 mounted in a 2×2 array. Other configurations and array dimensions of multiple electronic display devices, e.g. 1×4, 2×3, 5×6, etc., also fall within the scope of the present invention.

In operation, display 120 displays image data signals 102 output from controller 110. For a tiled display, as illustrated in FIG. 1, image data signals 102 are appropriately distributed among display tiles 130 such that a coherent image is displayed on a display surface 121 of display 120. Display surface 121 typically includes the combined display surfaces of display tiles 130. In addition, display 120 includes a touch-sensitive surface 131 that extends across part or all surface area of display tiles 130. In one embodiment, touch-sensitive surface 131 senses touch by detecting interference between a user and one or more beams of light, including, e.g., infrared laser beams. In other embodiments, touch sensitive surface 131 may rely on capacitive touch techniques, including surface capacitance, projected capacitance, or mutual capacitance, as well as optical techniques, acoustic wave-based touch detection, resistive touch approaches, and so forth, without limitation. Touch-sensitive surface 131 enables users to interact with assets displayed on the wall implementing touch gestures including tapping, dragging, swiping, and pinching. These touch gestures may replace or supplement the use of typical peripheral I/O devices, although touch-sensitive surface 131 may receive inputs from such devices, as well. In this regard, the display system 100 may also include typical peripheral I/O devices (not shown), such as an external keyboard or mouse, which also enable users to interact with assets.

In the context of this disclosure, an "asset" may refer to any interactive renderable digital content that can be displayed on a display, such as display 120, among others. Interactive renderable content is generally derived from one or more persistent or non-persistent content streams that include sequential frames of video data, corresponding audio data, metadata, flowable/reflowable unstructured content, and potentially other types of data. Generally, an asset may be displayed within a dynamically adjustable presentation window. For simplicity, an asset and corresponding dynamically adjustable presentation window are generally referred to herein as a single entity, i.e., an "asset." An asset generally includes at least one display output generated by a software application, such as a GUI of the software application. In one embodiment, the display output is a portion of a content stream. In addition, an asset is generally configured to receive one or more software application inputs via a gesture-sensitive display surface of a collaboration appliance/client system 140, i.e., inputs received via the gesture-sensitive display surface are received by the asset and treated as input for the software application associated with the asset. Thus, unlike a fixed image, an asset is a dynamic element that enables interaction with the software application associated with the asset, for example, for manipulation of the asset. For example, an asset may include select buttons, pull-down menus, control sliders, etc. that are associated with the software application and can provide inputs to the software application.

In general, an asset may comprise a content source or a captured image of a content source. In particular, assets may comprise content sources that are file-based, application-based (e.g., web-based), or Live Source. For example, assets may include images, videos, web browsers, documents, applications, instances of applications, renderings of laptop screens, presentation slides, any other graphical user interface (GUI) of a software application, and the like. An asset may comprise a file-based source comprising any of a plurality of different of native file types (such as pdf, doc, xls, etc.). Further, an asset may comprise a captured image of any such content source described herein. In these embodiments, the asset comprises a static image of a content source captured, for example, using an image capture or screen capture function or application (such as SnapShot®).

As also referred to herein, a "workspace" or "shared workspace" is a virtual digital canvas on which assets associated therewith, and their corresponding content streams, are displayed within a suitable dynamic "viewport window" on display 120. Thus, a shared workspace may comprise one or more associated assets (each asset displayed within a presentation window), whereby the entire shared workspace is displayed within a dynamically adjustable viewport window. A shared workspace may be displayed in the entire potential render area/space of the display 120, so that only a single shared workspace can be displayed on the surface thereof. In this case, the area of the viewport window that displays the shared workspace comprises the entire render area of the display 120. In other embodiments, however, the shared workspace and the viewport window may be displayed in a sub-area of the total display area of the display 120 that does not comprise the entire render area of the display 120. For example, multiple shared workspaces may be displayed in multiple viewport windows on the display 120 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

Touch-sensitive surface 131 may be a "multi-touch" surface, which can recognize more than one point of contact on display 120, enabling the recognition of complex gestures, such as two or three-finger swipes, pinch gestures, and rotation gestures as well as multiuser two, four, six etc. hands touch or gestures. Thus, one or more users may interact with assets on display 120 implementing touch gestures such as dragging to reposition assets on the screen, tapping assets to display menu options, swiping to page through assets, or implementing pinch gestures to resize assets. Multiple users may also interact with assets on the screen simultaneously. Again, examples of assets include application environments, images, videos, web browsers, documents, applications, instances of applications, mirroring or renderings of laptop screens, presentation slides, content streams, and so forth. Touch signals 103 are sent from a touch panel associated with a display 120 to central controller 110 for processing and interpretation.

It will be appreciated that the system shown herein is illustrative only and that variations and modifications are possible. For example, any of software applications 151, rendering engine 152, spawning module 153, and touch module 154 may reside outside of central controller 110.

Figure 2:
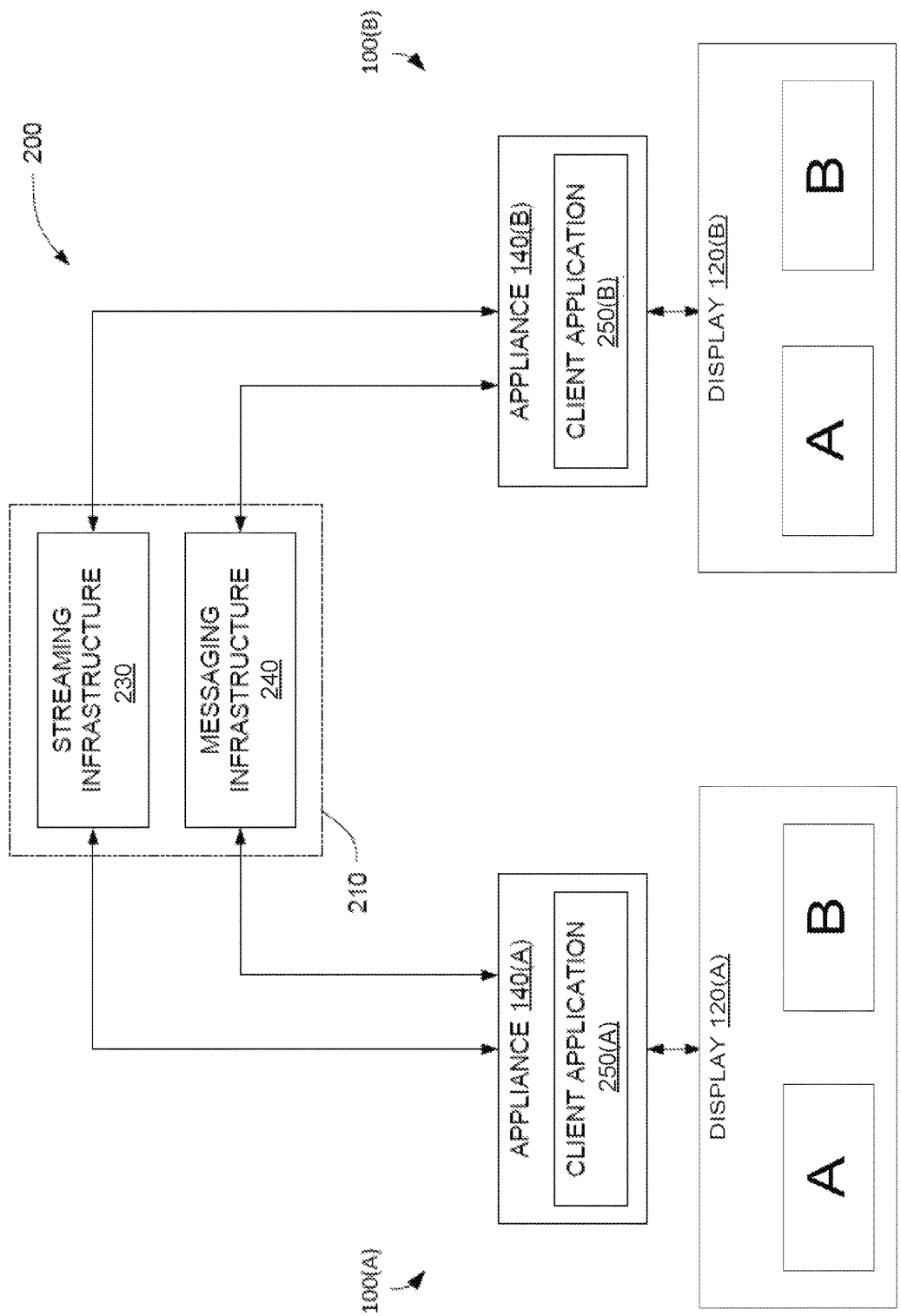
FIG. 2 is a conceptual diagram of a collaboration system configured to share content streams across display systems, according to various embodiments of the present invention.

FIG. 2 is a conceptual diagram of a collaboration system 200 configured to share content streams across display systems, according to various embodiments of the present invention. As shown, collaboration system 200 includes, without limitation, display systems 100A and 100B coupled together via a communication infrastructure 210 (also referred to herein as a "collaboration server"). As shown in FIG. 2, the communication infrastructure 210 includes streaming infrastructure 230 and messaging infrastructure 240. Additionally, display system 100A is shown to include appliance 140A as well as display 120A, and display system 100B is shown to include appliance 140B as well as display 120B. For illustrative purposes, the appliances 140A and 140B each include a central controller 110 (not shown). In one embodiment, each of displays 120A and/or 120B represents a different instance of display 120 of FIG. 1 Appliance devices 140A and 140B include client applications 250A and 250B, respectively.

Display system 100A is configured to share a content stream A, via communication infrastructure 210, with display system 100B. In response, display system 100B is configured to retrieve content stream A from communication infrastructure 210 and to display that content stream on display 120B with its content stream B. Likewise, display system 100B is configured to share content stream B, via communication infrastructure 210, with display system 100A. In response, display system 100A is configured to retrieve content stream B from communication infrastructure 210 and to display that content stream on display 120A with its content stream A. In this fashion, display systems 100A and 100B are configured to coordinate with one another to generate a shared workspace that includes content streams A and B. Content streams A and B may be used to generate different assets rendered within the shared workspace. In one embodiment, each of display systems 100A and 100B perform a similar process to reconstruct the shared workspace, thereby generating a local version of that shared workspace that is similar to other local versions of the shared workspace reconstructed at other display systems. As a general matter, the functionality of display systems 100A and 100B are coordinated by client applications 250A and 250B, respectively.

Client applications 250A and 250B are software programs that generally reside within a memory (not shown) associated with the respective appliances 140A and 140B. Client applications 250A and 250B may be executed by a processor unit (not shown) included within the respective computing appliances 140. When executed, client applications 250A and 250B setup and manage the shared workspace discussed above in conjunction with FIG. 2, which, again, includes content streams A and B. In one embodiment, the shared workspace is defined by metadata that is accessible by both display systems 100A and 100B. Each such display system 100 may generate a local version of the shared workspace that is substantially synchronized with the other local version, based on that metadata (discussed below in relation to FIG. 3).

In doing so, client application 250A is configured to transmit content stream A to streaming infrastructure 230 for subsequent streaming to display system 100B. Client application 250A also transmits a message to display system 100B, via messaging infrastructure 240, that indicates to display system 100B that content stream A is available and can be accessed at a location reflected in the message. In like fashion, client application 250B is configured to transmit content stream B to streaming infrastructure 230 for subsequent streaming to display system 100A. Client application 250B also transmits a message to display system 100A, via messaging infrastructure 240, that indicates to display system 100A that content stream B is available and can be accessed at a location reflected in the message. The message indicates that access may occur from a location within streaming infrastructure 230.

Client application 250A may also broadcast a message via messaging infrastructure 240 to display system 100B that specifies various attributes associated with content stream A that may be used to display content stream A. The attributes may include a location/position, a picture size, an aspect ratio, or a resolution with which to display content stream A on display 120B, among others, and may be included within metadata described below in relation to FIG. 3. Client application 250B may extract the attributes from messaging infrastructure 240, and then display content stream A at a particular position on display 120B, with a specific picture size, aspect ratio, and resolution, as provided by messaging infrastructure 240. Through this technique, display system 100A is capable of sharing content stream A with display system 100B. Display system 100B is configured to perform a complimentary technique in order to share content stream B with display system 100A.

Client applications 250A and 250B are thus configured to perform similar techniques in order to share content streams A and B, respectively with one another. When client application 250A renders content stream A on display 120A and, also, streams content stream B from streaming infrastructure 230, display system 100A thus constructs a version of a shared workspace that includes content stream A and B. Similarly, when client application 250B renders content stream B on display 120B and, also streams content stream A from streaming infrastructure 230, display system 100A similarly constructs a version of that shared workspace that includes content streams A and B.

The display systems 100A and 100B discussed herein are generally coupled together via streaming infrastructure 230 and messaging infrastructure 240. Each of these different infrastructures may include hardware that is cloud-based and/or collocated on-premises with the various display systems. However, persons skilled in the art will recognize that a wide variety of different approaches may be implemented to stream content streams and transport messages/messages between display systems.

Figure 3:
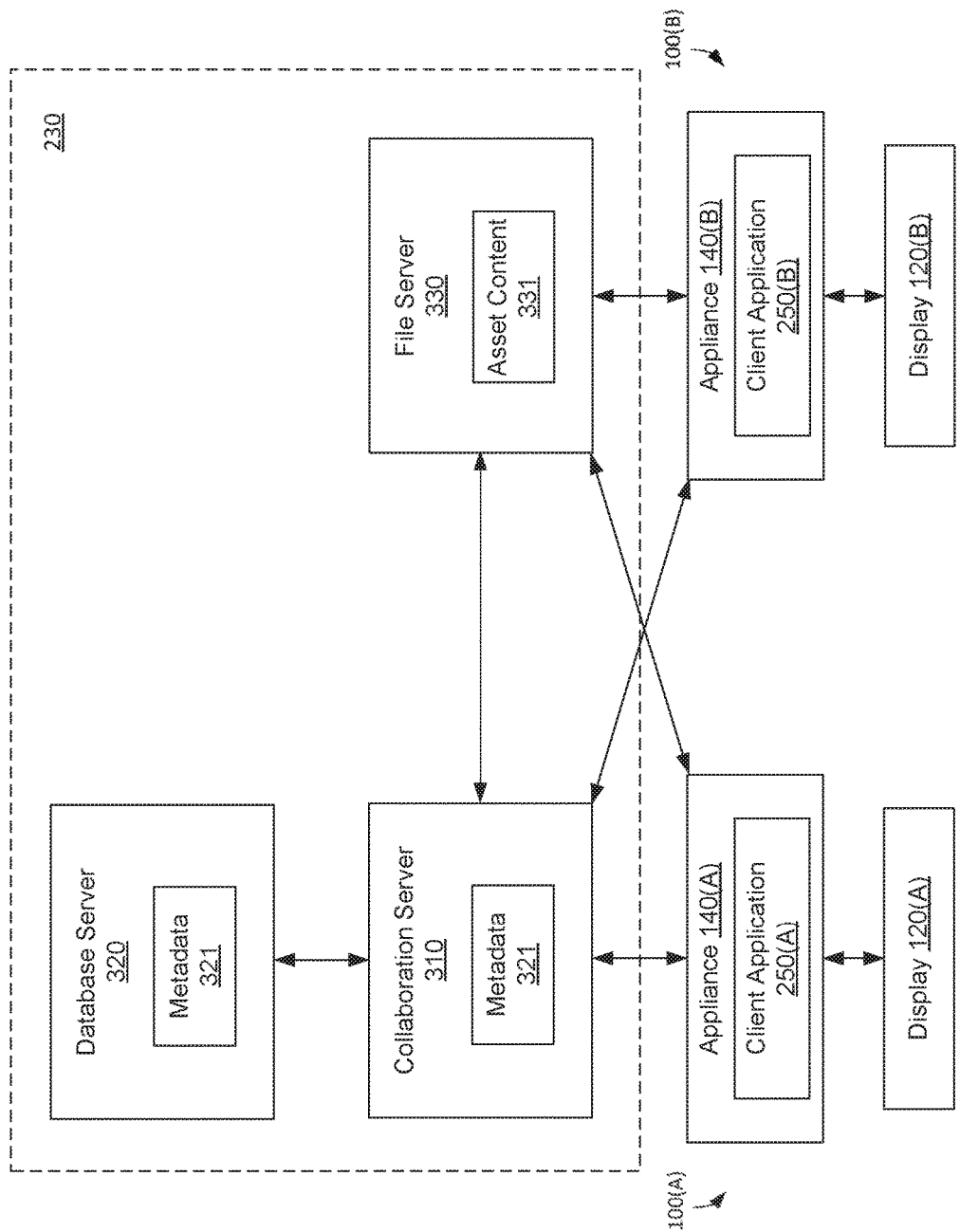
FIG. 3 is a more detailed block diagram of the streaming infrastructure of FIG. 2, according to various embodiments of the present invention.

FIG. 3 is a more detailed block diagram of the streaming infrastructure of FIG. 2, according to various embodiments of the present invention. Streaming infrastructure 230 may include a collaboration server 310, a database server 320, and a file server 330. Each server may comprise a computer device having a processor (such as processor unit 111 described in relation to FIG. 1) and a memory (such as memory 112 described in relation to FIG. 1), the processor executing software for performing functions and operations described herein. Collaboration server 310, database server 320, and file server 330 may be implemented as shown as separate and distinct computing devices/structures coupled to each other and to appliance systems 140 via a network. Alternatively, the functionality of collaboration server 310, database server 320, and file server 330 may be implemented as a single computing device/structure in a single location, or in any other technically feasible combination of structures. Further, one or more of collaboration server 310, database server 320, and/or file server 330 may be implemented as a distributed computing system. The network may be via any technically feasible communications or information network, wired or wireless, that allows data exchange, such as a wide area network (WAN), a local area network (LAN), a wireless (WiFi) network, and/or the Internet, among others.

Collaboration server 310 coordinates the flow of information between the various appliances 140, database server 320, and file server 330. Thus, in some embodiments, collaboration server 310 is a streaming server for appliances 140. In some embodiments, the application program interface (API) endpoint for appliances 140 and/or business logic associated with streaming infrastructure 230 resides in collaboration server 310. In addition, collaboration server 310 receives requests from appliances 140 and can send notifications to appliances 140. Therefore, there is generally a two-way connection between collaboration server 310 and each of appliances 140. Alternatively or additionally, appliances 140 may make requests on collaboration server 310 through the API. For example, during a collaborative work session on a particular project via collaboration system 200, a collaboration appliance 140 may send a request to collaboration server 310 for information associated with an asset to display the asset in a shared workspace of the particular project.

Database server 320 (as well as collaboration server 310) may store metadata 321 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc. Metadata 321 may also include asset metadata (also referred to as "asset information" herein) for each asset.

Asset metadata (asset information) for an asset may specify, for example, a display aspect ratio, a display location/position, and display dimensions/size of the asset within an associated shared workspace. The asset metadata may indicate an assigned aspect ratio for which to display the asset, such as a ratio of the width to the height of the asset. The asset metadata also indicates the display position and size of an asset, for example, implementing horizontal and vertical (x and y) coordinate values. In some embodiments, the asset metadata may express the position and size of an asset in percentage values. In such embodiments, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. When multiple display systems 100 separately display a shared workspace, each display system 100 may configure the local version of the shared workspace based on the received metadata. The asset metadata for displaying assets within a workspace may be stored to an server indicator data structure, discussed below in relation to FIG. 5.

File server 330 is the physical storage location for some or all asset content 331 that are rendered as files, such as documents, images, videos, applications, and the like. In some embodiments, file server 330 can receive requests for asset content 331 directly from appliances 140. For example, an asset, such as a word-processing document, may be associated with a shared workspace that is displayed on the display 120 of first and second appliances 140. When the asset is modified by a user at the first collaboration appliance 140A (via client application 250A), metadata for a file associated with the asset is updated in file server 330 by collaboration server 310, the second collaboration appliance 140B (via client application 250B) downloads the updated metadata for the file from file server 330, and the asset is then displayed, as updated, on the gesture-sensitive display surface of the second collaboration appliance 140B (via client application 250B). Thus, file copies of all assets for a particular shared workspace and project may be stored at the file server 330, as well as stored at each appliance 140 that is collaborating on a project.

Each appliance 140 (executing a client application 250) is an instance of a collaborative multi-media platform disposed at a different location in collaboration system 200. Each collaboration appliance 140 is configured to provide a digital system that can be mirrored at one or more additional and remotely located appliances 140. The functionality of each appliance 140 participating in a collaboration is coordinated by the client application 250 which provides functions and features of collaboration sessions described herein. In this manner, collaboration clients facilitate the collaborative modification of assets, shared workspaces, and/or complete presentations or other projects, as well as the presentation thereof.

Figure 4:
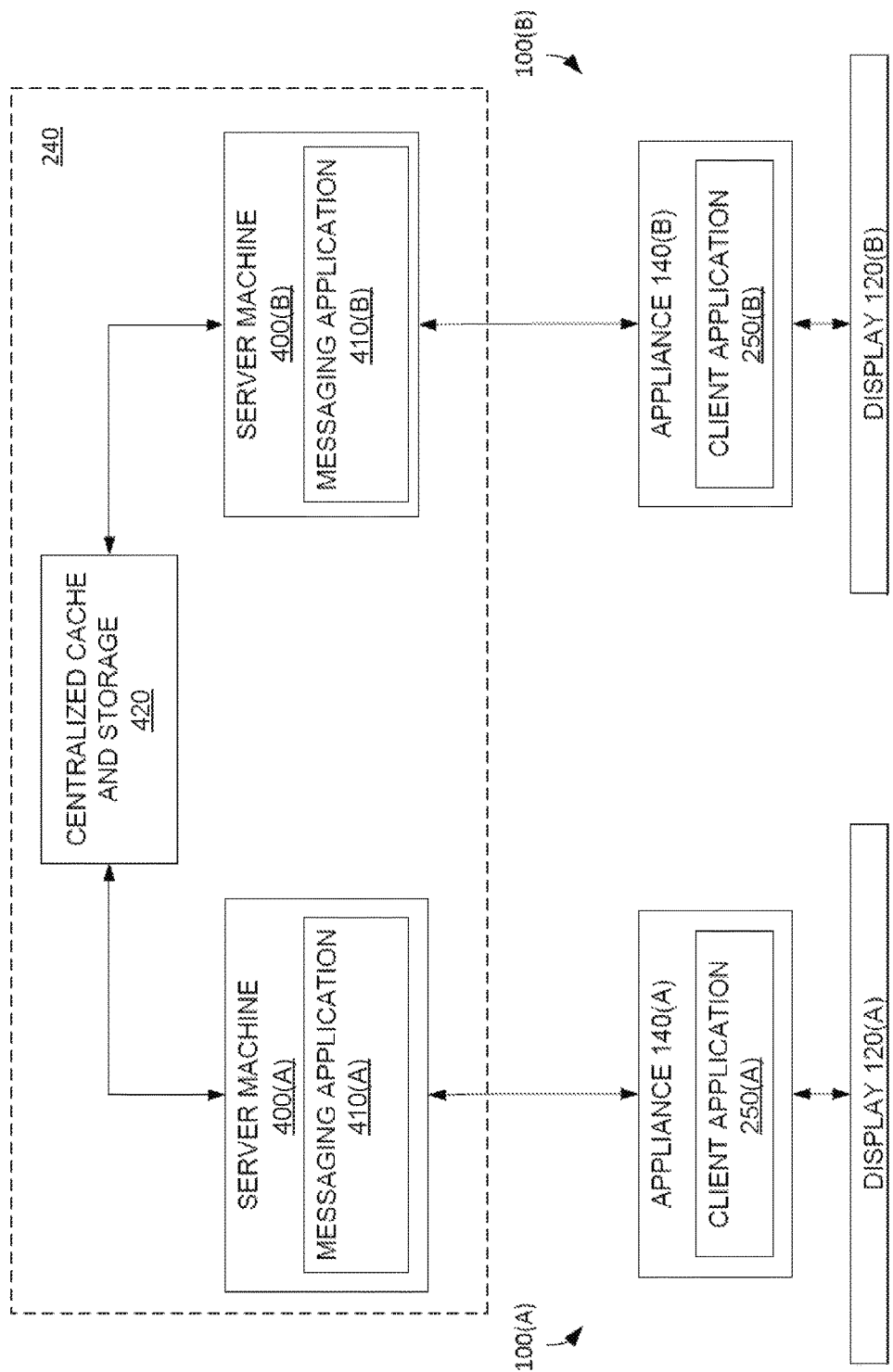
FIG. 4 is a more detailed block diagram of the messaging infrastructure of FIG. 2, according to one embodiment of the present invention.

FIG. 4 is a more detailed block diagram of the messaging infrastructure of FIG. 2, according to one embodiment of the present invention. As shown, messaging infrastructure 240 includes server machines 400A and 400B coupled together via centralized cache and storage 420. Server machine 400A is coupled to appliance 140A and includes a messaging application 410A. Server machine 400B is coupled to appliance 140B and includes a messaging application 410B.

Server machines 400A and 400B are generally cloud-based or on-premises computing devices that include memory (such as memory 112 described in relation to FIG. 1) and processor units (such as processor unit 111 described in relation to FIG. 1) configured to store and execute messaging applications 410A and 410B, respectively. Messaging applications 410A and 410B are configured to generate real-time socket connections with appliances 140A and 140B, respectively, to allow messages to be transported quickly between the appliances 140. In one embodiment, messaging applications 410A and 410B are implemented as ASP.NET applications and rely on signalR WebSockets to accomplish fast, real-time messaging.

Centralized cache and storage 420 provide a persistent messaging back-end through which messages can be exchanged between messaging applications 410A and 410B. In one embodiment, centralized cache and storage includes a Redis cache backed by a SQL database. Messaging applications 410A and 410B may be configured to periodically poll centralized cache and storage 420 for new messages, thereby allowing messages to be delivered to those applications quickly.

In operation, when display system 100A transmits a message indicating that content stream A is available on streaming infrastructure, as described above, display system 100A transmits that message to messaging application 410A. Messaging application 410A may then relay the message to centralized cache and storage 420. Messaging application 410B polls centralized cache and storage 420 periodically, and may thus determine that that the message has arrived. Messaging application 410B then relays the message to display system 100B. Display system 100B may then parse the message to retrieve an identifier associated with display system 100A, and then stream content associated with display system 100A from streaming server.

Network Indicator Feature

In some embodiments, the collaboration system is configured to generate and display at least one network indicator at each appliance 140 (referred to herein as a "client device" or "client") in a collaboration session. The network indicator may graphically/visually represent the current quality of a network connection between a client 140 and the communication infrastructure 210 (referred to herein as a "collaboration server"). The collaboration system may generate and display at each client 140 one or more different types of network indicators, including a connection indicator (local or remote), a metric indicator, or a combined remote connection indicator.

A connection indicator (local or remote) may represent a plurality of different metrics specifying a plurality of different network connection attributes. Thus, the connection indicator may represent a combination of metric contributors that together represent an overall quality of the network connection between a client 140 and the collaboration server 210 during a collaboration session. The collaboration server 210 may store and transmit the plurality of different metrics and a plurality of weights to each client 140 participating in the collaboration session. In some embodiments, each weight in the plurality of weights corresponds to a particular metric in the plurality of metrics, wherein at least some of the weights have different values.

A local connection indicator may represent the overall quality of the network connection between a local client 140 and the collaboration server. A remote connection indicator may represent the overall quality of the network connection between a particular remote client 140 and the collaboration server. A local client 140 may thus generate and display a local connection indicator and receive and display one or more remote connection indicators for one or more remote clients 140 participating in the collaboration session. Alternatively, the local client 140 may generate and display a combined remote connection indicator that represents a combination of multiple remote connection indicators for multiple remote clients 140 participating in the collaboration session. Thus, the combined remote connection indicator may represent the overall quality of the network connections between the multiple remote clients 140 and the collaboration server. In further embodiments, a client 140 may generate and display a metric indicator that represents only a single metric specifying a specific network connection attribute.

The collaboration system may generate and display at each client 140 one or more different types of network indicators to provide the participants/users of the collaboration session easily accessible and discernible information regarding the quality of a network connection between clients (local and/or remote) and the collaboration server. Thus, the network indicators may help the users efficiently determine the cause of any performance issues incurred during the collaboration session and to take appropriate actions to resolve the performance issues. Further, the remote connection indicators for remote clients may provide the local user easily accessible and discernible information regarding the quality of the network connection between the remote clients and the collaboration server. Thus, the remote connection indicators may efficiently provide the local user with knowledge of any performance issues at any of the remote clients during the collaboration session.

Figure 5:
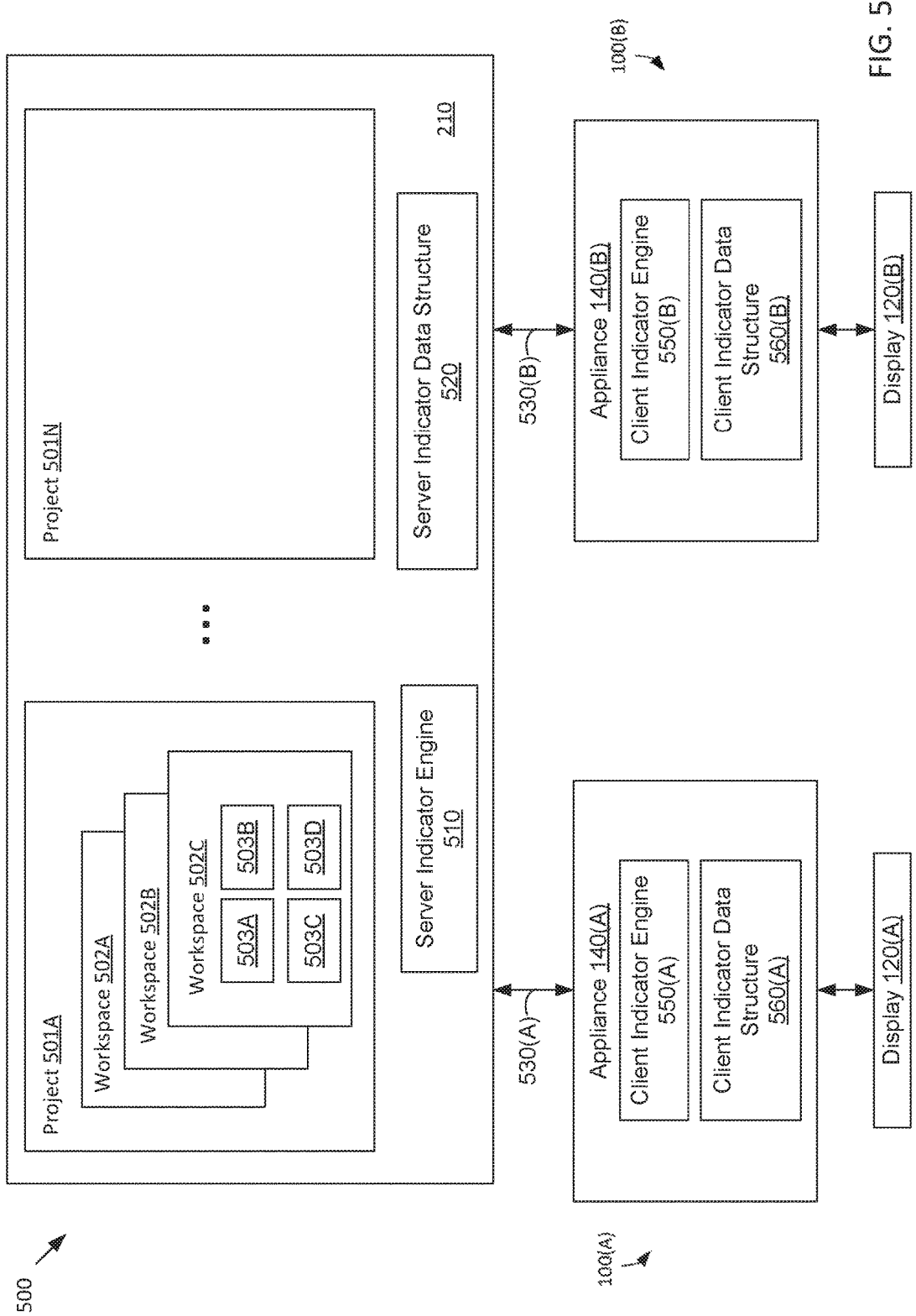
FIG. 5 is a conceptual diagram of the collaboration system of FIG. 2 configured to display a network indicator associated with a collaboration session, according to various embodiments of the present invention.

FIG. 5 is a conceptual diagram of the collaboration system of FIG. 2 configured to display a network indicator associated with a collaboration session, according to various embodiments of the present invention. As shown, collaboration system 500 includes, without limitation, a collaboration server 210 (communication infrastructure) connected with one or more display systems 100 (such as 100A and 100B), each display system 100 comprising an appliance/client 140 (such as 140A and 140B, respectively) and a display 120 (such as 120A, and 120B, respectively). Each client 140 comprises a client computing device that includes a central controller 110 (not shown) executing a client application 250 (not shown). For example, a client 140 may comprise a workstation, a laptop computer, a tablet, cell phone or other hand-held device, or any other type of computing device. The collaboration server 210 is connected with each client 140 via a separate network connection 530 (such as 530A and 530B). The network connection 530 may comprise any technically feasible communications or information network, wired or wireless, that allows data exchange, such as a wide area network (WAN), a local area network (LAN), a wireless (Wi-Fi) network, and/or the Internet, among others.

As described above in relation to FIGS. 1-4, the collaboration server 210 may store one or more projects 501, each project 501 comprising a set of one or more associated shared workspaces 502. In addition, a client identifier (client ID) and/or organization identifier (organization ID) may be associated with one or more projects 501, each project 501 comprising one or more shared workspaces 502. For example, a client 140 may log on to the collaboration server 210 using a client ID and/or organization ID to retrieve and access one or more projects 501 associated with the client ID and/or organization ID. The various associations/mappings between the client ID, organization ID, projects 501, and shared workspaces 502 may be stored to the collaboration server 210.

Each shared workspace 502 may include one or more associated assets 503. For example, the projects 501, workspaces 502, and assets 503 may be stored in the collaboration server 310, database server 320, and/or file server 330 of the collaboration server 210. As described above, during a collaboration session, the collaboration server 210 may work in conjunction with the clients 140 to share and display a shared workspace 502 of a project 501 across multiple display systems 100. Each client 140 in the collaboration session may display one or more assets 503 of the shared workspace 502 according to the asset metadata/information (stored to the collaboration server 210) associated with each asset 503. The collaboration server 210 may also work in conjunction with the clients 140 to mirror user interactions of assets 503 of the shared workspace 502 at any client 140 across the multiple display systems 100 and clients 140. For example, a user interaction of an asset (e.g., moving or resizing the asset) at a first client 140A is displayed/reflected at the first client 140A and also is displayed/reflected at the second client 140A via the collaboration server 210.

The collaboration server 210 also executes a server indicator engine 510 that manages and maintains a server indicator data structure 520. A server indicator data structure 520 may be associated with a particular client ID, organization ID, project 501, and/or workspace 502. For example, when a client 140 logs on to the collaboration server 210 using a client ID and/or organization ID, the collaboration server 210 may retrieve a server indicator data structure 520 associated with the client ID and/or organization ID and transmit the server indicator data structure 520 to each client 140 participating in a collaboration session. The server indicator data structure 520 may then be applied to each project 501 and shared workspace 502 associated with the client ID and/or organization ID. As another example, when a client 140 accesses a particular project 501 on the collaboration server 210, the collaboration server 210 may retrieve a server indicator data structure 520 associated with the particular project 501 and transmit the server indicator data structure 520 to each client 140 participating in a collaboration session for the particular project 501. The server indicator data structure 520 may then be applied to each shared workspace 502 associated with the particular project 501.

The server indicator data structure 520 may specify a plurality of metrics (indicating a plurality of network connection attributes) and a separate weight to be applied to each metric. At the beginning of a collaboration session, the collaboration server 210 may transmit the server indicator data structure 520 to each client 140 participating in the collaboration session. Each client 140 may execute a client indicator engine 550 (such as 550A and 550B) that manages and maintains a client indicator data structure 560 (such as 560A and 560B). The client indicator engine 550 may comprise a component of the client application 250 (not shown) that executes on the client 140. At each client 140, the client indicator engine 550 may perform embodiments described herein using the client indicator data structure 560 to generate and display one or more network indicators at the local display 120 of the client 140. In these embodiments, the client indicator engine 550 of each client 140 may generate and display one or more different types of network indicators (such as a local or remote connection indicator, a metric indicator, etc.) based on the received server indicator data structure 520. Each client indicator engine 550 may do so by calculating a local overall connection value representing the local overall quality of the network connection between the client 140 and the collaboration server 210. The local overall connection value may be calculated by the client indicator engine 550 based on the plurality of metrics and plurality of weights specified in the server indicator data structure 520. The metrics, weights, and values used to determine the overall connection value may be stored to the client indicator data structure 560.

In further embodiments, the client indicator engine 550 of each client 140 also transmits its local overall connection value to the server indicator engine 510 of the collaboration server 210, which in turn stores and transmits the overall connection value to each of the other clients 140 participating in the collaboration session. In this manner, the collaboration server 210 receives, stores, and transmits multiple overall connection values from multiple clients 140 participating in the collaboration session. Each client 140 may then receive one or more remote overall connection values and generate and display a remote connection indicator for each of the one or more remote overall connection values. Each remote connection indicator may represent the overall quality of the network connection between a remote client 140 and the collaboration server 210. Alternatively, a client 140 may generate and display a single combined remote connection indicator based on the multiple overall connection values received from multiple clients 140. The combined remote connection indicator may represent the overall quality of the network connection between multiple remote clients 140 and the collaboration server 210.

The server indicator engine 510 may reside and execute within the collaboration server 310 and the server indicator data structure 520 may be stored on the collaboration server 310 and/or the database server 320. The collaboration server 210 (via the server indicator engine 510) may maintain and update a server indicator data structure 520 during a collaboration session. For example, the server indicator engine 510 may update the server indicator data structure 520 when an updated overall connection value is received from a particular client 140 (indicating an updated overall quality of the network connection) during the collaboration session. The collaboration server 210 may then store and transmit the updated overall connection value to each of the other clients 140 in the collaboration session. In turn, each of the other clients 140 then generates and displays an updated remote connection indicator representing the updated overall connection value for the particular client 140.

FIG. 6 is a conceptual diagram of the server indicator data structure of FIG. 5, according to various embodiments of the present invention. The server indicator data structure 520 may be retrieved by the collaboration server 210 (e.g., from the collaboration server 310 or database server 320) at the start of a collaboration session for a shared workspace 502 and transmitted to each client 140 participating in the collaboration session. The server indicator data structure 520 may be associated with a particular client ID, organization ID, project 501, and/or shared workspace 502. As shown, the server indicator data structure 520 includes a first section 605 and a second section 610. In other embodiments, the first section 605 and the second section 610 may be stored to separate data structures.

The first section 605 of the server indicator data structure 520 specifies a plurality of metrics 630 and a plurality of weights 640. Each metric 630 specifies a particular network connection attribute (such as latency, bandwidth, etc.), discussed below in relation to FIG. 7. Each weight 640 corresponds and applies to a particular metric 630. The different weights 640 assigned to different metrics 630 may indicate the relative importance of each metric in determining the overall quality of the network connection. For example, the value of the weights 640 may be configured to fall within a predetermine range of values (e.g., 0 to 1, 0-10, etc.). A higher weight value for a metric indicates a higher importance of the metric in determining the overall quality of the network connection than a metric having a lower weight value. In some embodiments, the values for the plurality of weights 640 may differ based on the client ID, organization ID, and/or project 501 associated with the server indicator data structure 520. In these embodiments, the values for the plurality of weights 640 may be customized for a particular client ID, organization ID, and/or project 501. In this manner, different metrics (network connection attributes) may be given different levels of importance depending on the client ID, organization ID, and/or project 501.

The second section 610 of the server indicator data structure 520 specifies a plurality of client IDs 650 and a plurality of overall connection values 660. Each client ID 650 comprises a unique identifier for a client 140 participating in the collaboration session. Each overall connection value 660 corresponds to a particular client ID 650 and client 140. As discussed above, each client 140 in the collaboration session calculates an overall connection value based on the plurality of metrics 630 and the plurality of weights 640 and transmits the overall connection value to the collaboration server 210. The collaboration server 210 then stores the overall connection values 660 along with the corresponding client IDs 650 to the server indicator data structure 520 and transmits the overall connection values 660 to the other clients 140 in the collaboration session.

FIG. 7 is a conceptual diagram of a client indicator data structure of FIG. 5, according to various embodiments of the present invention. Each client 140 may execute a client indicator engine 550 that manages and maintains a client indicator data structure 560 to generate and display one or more network indicators at the client 140. As shown, the client indicator data structure 560 comprises a plurality of entries 701, each entry 701 representing a particular metric. Each entry 701 comprises a plurality of data fields, including the metric 630, weight 640, measured value 745, normalized value 750, and weighted value 755.

The metric 630 and corresponding weight 640 in each entry 701 are determined from the server indicator data structure 520 received from the collaboration server 210. Each metric 630 specifies a particular network connection attribute that affects the quality of the network connection. In some embodiments, the plurality of metrics include at least two of network latency, uplink/upload network bandwidth, downlink/download network bandwidth, web socket connection status, and order tagging level. The measured value 745 for a metric 630 may comprise the actual value measured for the metric, the measured value in a unit appropriate for the metric. Each client 140 may continually perform a specific test/measurement procedure (e.g., at predetermined time intervals) to continually determine an updated measured value 745 for each metric 630.

Network latency indicates an amount of time for the collaboration server 210 to receive and process a request made by a client 140. Each client 140 may determine the current network latency by continually performing a simple ping operation with the collaboration server 210 via the network connection, such as a basic TCP-based message sent to and received from the collaboration server 210. The total end-to-end request/response time of the ping operation may be measured and recorded to the client indicator data structure 560. Network latency is typically measured in milliseconds ($\frac{1}{1,000}$ sec), although other units for measuring network latency may also be used.

Uplink/upload network bandwidth indicates the network bandwidth available for uploading data from the client 140 to the collaboration server 210. Each client 140 may determine the current upload network bandwidth by continually performing an upload operation with the collaboration server 210 via the network connection, such as uploading a small file of known data size and measuring the elapsed time required for completing the upload. The data size of the upload may be divided by the elapsed time to determine the current upload network bandwidth, which is then recorded to the client indicator data structure 560.

Downlink/download network bandwidth indicates the network bandwidth available for downloading data from the collaboration server 210 to the client 140. Each client 140 may determine the current download network bandwidth by continually performing a download operation with the collaboration server 210 via the network connection, such as downloading a small file of known data size and measuring the elapsed time required for completing the download. The data size of the download may be divided by the elapsed time to determine the current download network bandwidth, which is then recorded to the client indicator data structure 560.

Web socket connection status indicates whether there is currently an active or inactive web socket connection between the client 140 and the collaboration server 210. Thus, the web socket connection status indicates whether there the network connection between the client 140 and the collaboration server 210 is currently connected or disconnected. Each client 140 may determine the web socket connection status by continually checking on Transmission Control Protocol (TCP) to detect loss of network connectivity or performing Web socket pings with the collaboration server 210, such as sending a message to the collaboration server 210 to transmit a Web Socket ping to the client 140. The status of the web socket connection is then recorded to the client indicator data structure 560. For example, a value of 0 may be recorded to the client indicator data structure 560 to indicate an inactive web socket connection and a value of 1 may be recorded to the client indicator data structure 560 to indicate an active web socket connection.

Order tagging level indicates a level of data loss and/or data arriving out of order in the network connection between the client 140 and the collaboration server 210. Thus, the order tagging indicates the amount of jittering in the network connection between the client 140 and the collaboration server 210. Each client 140 may determine the order tagging level by continually performing a messaging operation with the collaboration server 210 via the network connection. In the messaging operation, the client 140 may receive several messages from the collaboration server 210, each message marked with an order index number. The client 140 then determines a total number of messages that were lost and/or a total number of messages that were received out of order, which are then recorded to the client indicator data structure 560.

After the measured value 745 for each metric 630 is determined, the normalized value 745 for each metric 630 may be determined for the measured value 745. The normalized value 745 for a metric 630 may comprise a normalized value based on the measured value 745 for the metric 630. Since the measured values 745 for the different metrics comprise different units and scales, normalization of the measured values 745 may be needed to adjust the measured values 745 to a common scale and value range. For example, each measured value 745 may be normalized to fall into a predetermined range of values (e.g., 0 to 5, 0 to 10, etc.). A normalized value 745 for each measured value 745 may be determined such that a lower normalized value 750 for a metric 630 indicates a lower quality of the metric 630 than a higher normalized value 750. For example, for the network latency metric, a lower measured value 745 may result in a higher normalized value 745 and a higher measured value 745 may result in a lower normalized value 745. As another example, for the network bandwidth metric, a higher measured value 745 may result in a higher normalized value 745 and a lower measured value 745 may result in a lower normalized value 745. In other embodiments, a normalized value 745 for each measured value 745 may be determined such that a higher normalized value 750 for a metric 630 indicates a lower quality of the metric 630 than a lower normalized value 750.

The weighted value 755 for a metric 630 may comprise a value that is based on the corresponding weight 640 and the normalized value 745 for the metric 630. The weighted value 755 for a metric 630 may be determined by applying the corresponding weight 640 to the corresponding normalized value 745 (e.g., by multiplying the weight 640 and the normalized value 745). Typically, a higher weighted value 755 for a metric 630 may indicate a higher quality of the metric 630 than a lower weighted value 755. In other embodiments, a lower weighted value 755 for a metric 630 may indicate a higher quality of the metric 630 than a higher weighted value 755.

The client indicator data structure 560 also includes a separate data field for an overall connection value 660. The overall connection value 660 may be calculated based on the plurality of measured values 745, normalized values 750, and/or weighted values 755. For example, the overall connection value 660 may be calculated based on the plurality of weighted values 755. For example, the overall connection value 660 may be calculated by summing the plurality of weighted values 755 or determining an average of the plurality of weighted values 755. In other embodiments, the overall connection value 660 may be calculated using different types of calculations using the plurality of measured values 745, normalized values 750, and/or weighted values 755 determined for the plurality of metrics 630. The overall connection value 660 may be configured to fall within a predetermined range of values (e.g., 0 to 4, 0 to 10, etc.). The overall connection value 660 is based on a combination of different network connection attributes and represents an overall quality of a network connection between the client 140 and the collaboration server 210.

Once the client indicator engine 550 of the client 140 determines the overall connection value 660, the client indicator engine 550 then generates and displays at the client 140 a connection indicator that graphically/visually represents the overall connection value 660. Further, each client 140 also transmits the client ID and calculated overall connection value 660 to the collaboration server 210 which stores the overall connection value 660 along with the corresponding client ID 650 to the server indicator data structure 520.

Each client 140 may continually perform a specific test/measurement procedure (e.g., at predetermined time intervals) to determine the most current measured value 745 for each metric 630. Each updated measured value 745 for a metric 630 also updates the normalized value 750 and weighted value 755 for the metric 630, as well as the overall connection value 660 for all the metrics 630. Whenever an overall connection value 660 for a client 140 is updated, the client 140 generates and displays an updated connection indicator 801 to represent the updated overall connection value 660. In this manner, the most current overall connection value 660 is represented by the connection indicator 801 and displayed at the client 140. Whenever an overall connection value 660 for a client 140 is updated, the client 140 also transmits the updated overall connection value 660 to the collaboration server 210, which then transmits the updated overall connection value 660 to the other clients 140 in the collaboration session.

FIG. 8A is a screenshot of a rendering of a shared workspace that includes a first type of local connection indicator, according to various embodiments of the present invention. As shown, the assets A (503A), B (503B), C (503C), and D (503D) associated with the shared workspace 502 are displayed within the shared workspace 502. The connection indicator 801 may be displayed within the shared workspace 502 or displayed outside the shared workspace 502. The shared workspace 502 and connection indicator 801 are displayed/rendered at display 120 of a local client 140. The client indicator engine 550 executing on the local client 140 generates and displays the local connection indicator 801 using the client indicator data structure 560. The connection indicator 801 represents the calculated overall connection value 660 stored to the client indicator data structure 560. Thus, the connection indicator 801 visually represents the overall quality of the network connection between the local client 140 and the collaboration server 210.

The first type of connection indicator 801 comprises a threshold-based connection indicator 801 that includes a plurality of different visual appearances corresponding to a plurality of different threshold levels for the overall connection value. For example, the threshold-based connection indicator 801 may include a plurality of different bars representing a plurality of different threshold levels for the overall connection value. The different threshold levels reflect different relative levels of the overall quality of the network connection between the local client 140 and the collaboration server 210 (e.g., poor, medium, strong). In the example of FIG. 8A, the connection indicator 801 is generated based on four threshold levels/values for the overall connection value 660, wherein the overall connection values 660 are configured to comprise values that fall within a predetermined range of values of 0 to 4. For example, if the overall connection value 660 is between 0 and 1, the displayed connection indicator 801 may comprise one colored bar; if the overall connection value 660 is between 1 and 2, the displayed connection indicator 801 may comprise two colored bars; if the overall connection value 660 is between 2 and 3, the displayed connection indicator 801 may comprise three colored bars; and if the overall connection value 660 is between 3 and 4, the displayed connection indicator 801 may comprise four colored bars.

In addition to showing a different number of colored bars depending on the overall connection value 660, the threshold-based connection indicator 801 may display other types of different visual appearances depending on the overall connection value 660. In some embodiments, the bars may be colored in different colors depending on the overall connection value 660. For example, if the overall connection value 660 is between 0 and 1, the displayed connection indicator 801 may comprise one colored red bar; if the overall connection value 660 is between 1 and 2, the displayed connection indicator 801 may comprise two colored orange bars; if the overall connection value 660 is between 2 and 3, the displayed connection indicator 801 may comprise three colored yellow bars; and if the overall connection value 660 is between 3 and 4, the displayed connection indicator 801 may comprise four colored green bars.

Figure 8B:
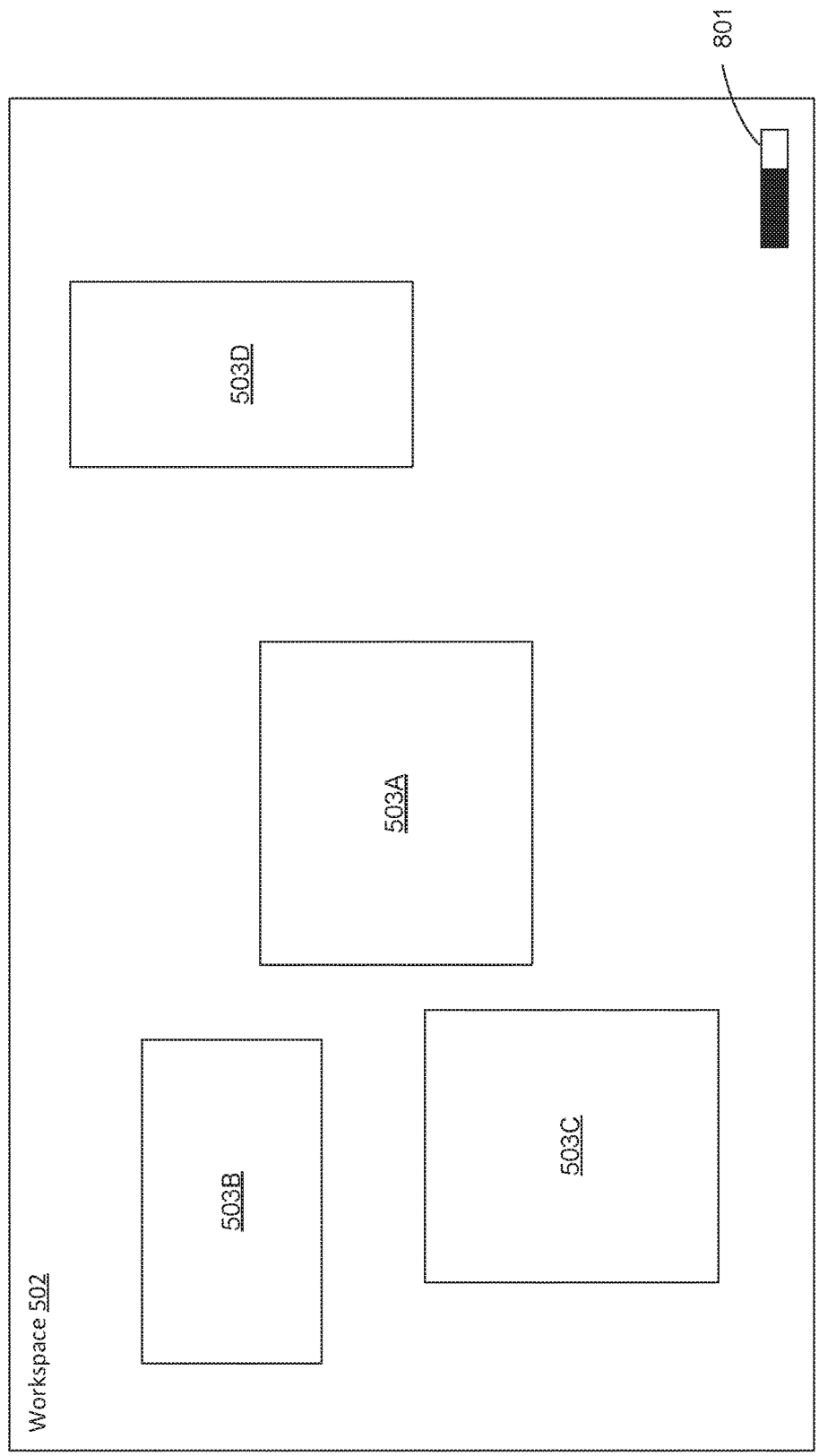
FIG. 8B is a screenshot of a rendering of a shared workspace that includes a second type of local connection indicator, according to various embodiments of the present invention.

FIG. 8B is a screenshot of a rendering of a shared workspace that includes a second type of local connection indicator, according to various embodiments of the present invention. The second type of connection indicator 801 comprises a value-based connection indicator 801 that more directly represents the overall connection value 660 without the use of threshold levels. For example, the overall connection values 660 may be configured to comprise values that fall within a predetermined range of values of 0 to 100. The second type of connection indicator 801 may include an empty bar that represents the range of values from 0 to 100. The second type of connection indicator 801 may also include a colored bar displayed within the empty bar, the colored bar representing the overall connection value 660 that falls within the range of 0 to 100. As shown, the length of the colored bar displayed within the empty bar visually represents the calculated overall connection value 660 relative to the range of values from 0 to 100.

Figure 9:
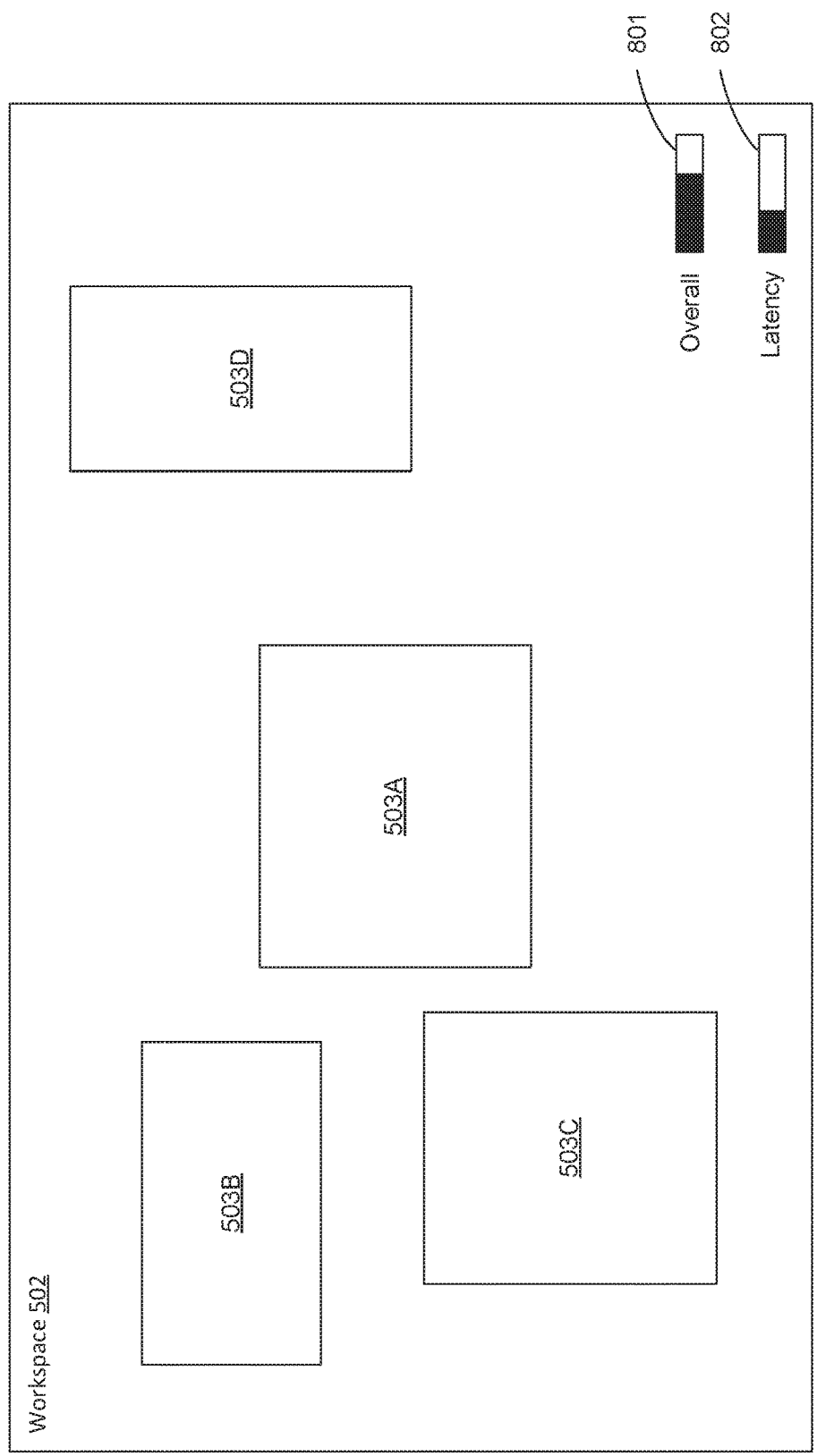
FIG. 9 is a screenshot of a rendering of a shared workspace that includes a local connection indicator and a metric indicator, according to various embodiments of the present invention.

FIG. 9 is a screenshot of a rendering of a shared workspace that includes a local connection indicator and a metric indicator, according to various embodiments of the present invention. The metric indicator 802 may be displayed within the shared workspace 502 or outside the shared workspace 502. The client indicator engine 550 executing on the local client 140 generates and displays the metric indicator 802 using the client indicator data structure 560. The metric indicator 802 may comprise a threshold-based metric indicator 802 similar to the threshold-based connection indicator 801 described in relation to FIG. 8A. In other embodiments, the metric indicator 802 may comprise a value-based metric indicator 802 (as shown in FIG. 9) similar to the value-based connection indicator 801 described in relation to FIG. 8B.

The metric indicator 802 may represent a specific metric 630 stored to the client indicator data structure 560. Thus, the metric indicator represents a single metric specifying a specific network connection attribute. For example, the metric indicator 802 may represent a network latency metric, network bandwidth metric, or any other network connection metric. The client indicator engine 550 may also display text adjacent to the metric indicator 802 to identify which metric is being represented by the metric indicator 802. The client indicator engine 550 may also display text adjacent to the local connection indicator 801 to distinguish the local connection indicator 801 from the metric indicator 802. In some embodiments, the metric indicator 802 visually represents the weighted value 755 calculated for the particular metric 630. In other embodiments, the metric indicator 802 may visually represent other values determined for the particular metric 630 (such as the measured value 745 or the normalized value 750). In some embodiments, the client indicator engine 550 is configured to automatically generate and display a metric indicator 802 representing the metric 630 having the highest assigned weight value 640 in the client indicator data structure 560. In these embodiments, the client indicator engine 550 is configured to automatically determine the metric 630 having the highest weight value 640 in the client indicator data structure 560 and generate and display a metric indicator 802 representing the metric 630.

Figure 10:
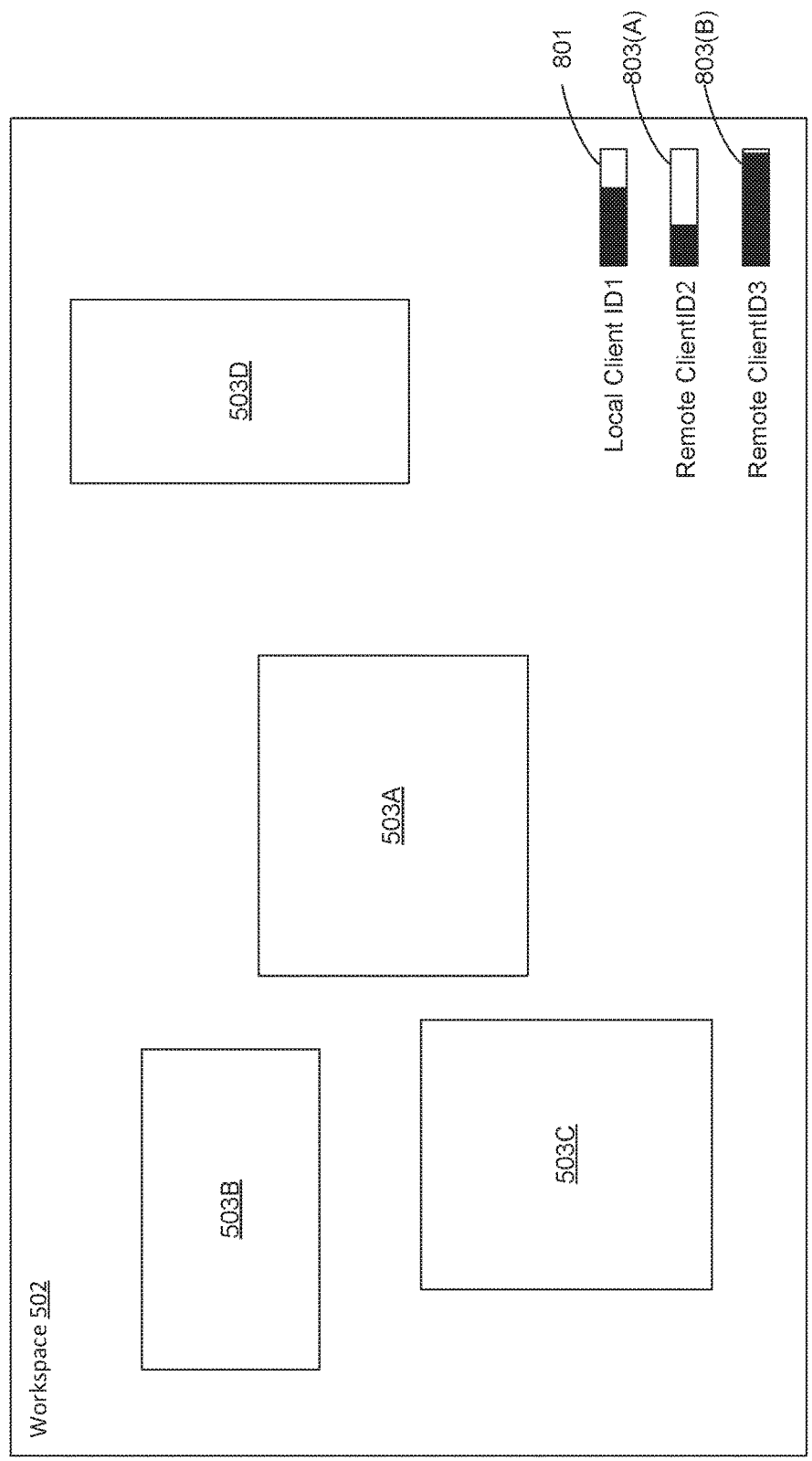
FIG. 10 is a screenshot of a rendering of a shared workspace that includes a local connection indicator and multiple remote connection indicators, according to various embodiments of the present invention.

FIG. 10 is a screenshot of a rendering of a shared workspace that includes a local connection indicator and multiple remote connection indicators, according to various embodiments of the present invention. The one or more remote connection indicators 803 (such as 803A and 803B) may be displayed within the shared workspace 502 or outside the shared workspace 502. Each remote connection indicator 803 may comprise a threshold-based remote connection indicator 803 similar to the threshold-based connection indicator 801 described in relation to FIG. 8A. In other embodiments, each remote connection indicator 803 may comprise a value-based remote connection indicator 803 (as shown in FIG. 10) similar to the value-based connection indicator 801 described in relation to FIG. 8B.

As discussed above, the local client 140 may receive one or more remote overall connection values 660 from the collaboration server 210, each remote overall connection value 660 representing the overall quality of a network connection between a corresponding remote client 140 and the collaboration server 210. The client indicator engine 550 executing on the local client 140 then generates and displays at least one remote connection indicator 803 for at least one remote overall connection value 660 received from the collaboration server 210. The client indicator engine 550 may also display a remote client ID adjacent to each remote connection indicator 803 to identify the remote client 140 corresponding to the remote connection indicator 803. The client indicator engine 550 may also display a local client ID adjacent to the local connection indicator 801 to distinguish the local connection indicator 801 from the one or more remote connection indicators 803.

Figure 11:
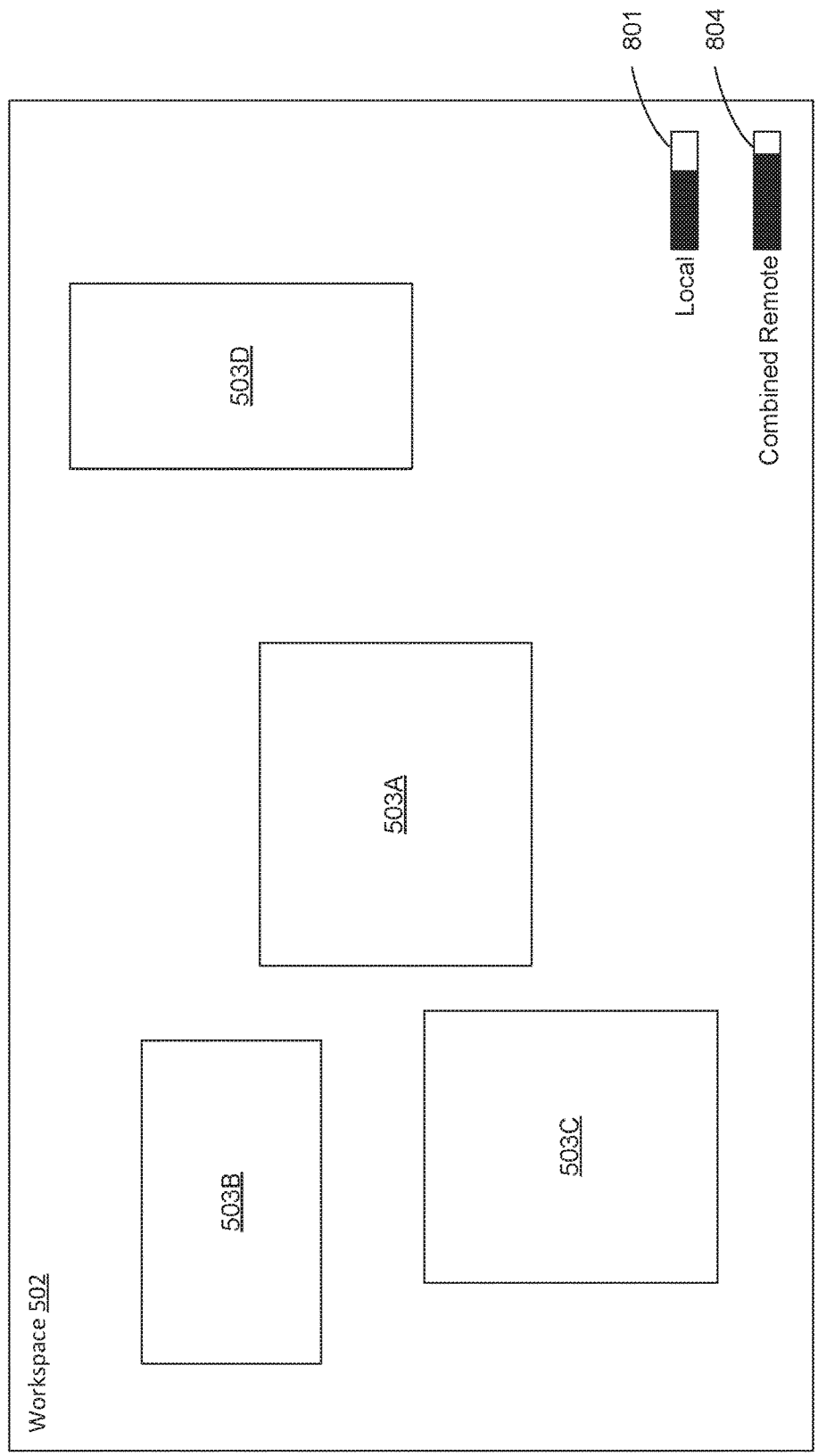
FIG. 11 is a screenshot of a rendering of a shared workspace that includes a local connection indicator and a combined remote connection indicator, according to various embodiments of the present invention.

Alternatively, the local client 140 may generate and display a combined remote connection indicator that represents a combination of multiple remote overall connection values 660 for multiple remote clients 140 participating in the collaboration session. FIG. 11 is a screenshot of a rendering of a shared workspace that includes a local connection indicator and a combined remote connection indicator, according to various embodiments of the present invention. The combined remote connection indicator 804 may be displayed within the shared workspace 502 or outside the shared workspace 502. The combined remote connection indicator 804 may comprise a threshold-based combined remote connection indicator 804 similar to the threshold-based connection indicator 801 described in relation to FIG. 8A. In other embodiments, the combined remote connection indicator 804 may comprise a value-based combined remote connection indicator 804 (as shown in FIG. 11) similar to the value-based connection indicator 801 described in relation to FIG. 8B.

The client indicator engine 550 executing on the local client 140 may generate the combined remote connection indicator 804 based on multiple remote overall connection values 660 received from the collaboration server 210. For example, the client indicator engine 550 may sum or average the multiple remote overall connection values 660 and generate the combined remote connection indicator 804 based on the resulting sum or average. Thus, the combined remote connection indicator 804 may represent the overall quality of the network connections between the multiple remote clients 140 and the collaboration server 210. The client indicator engine 550 may also display text adjacent to the combined remote connection indicator 804 to identify the combined remote connection indicator 804. The client indicator engine 550 may also display text adjacent to the local connection indicator 801 to distinguish the local connection indicator 801 from the combined remote connection indicator 804.

Figure 12A:
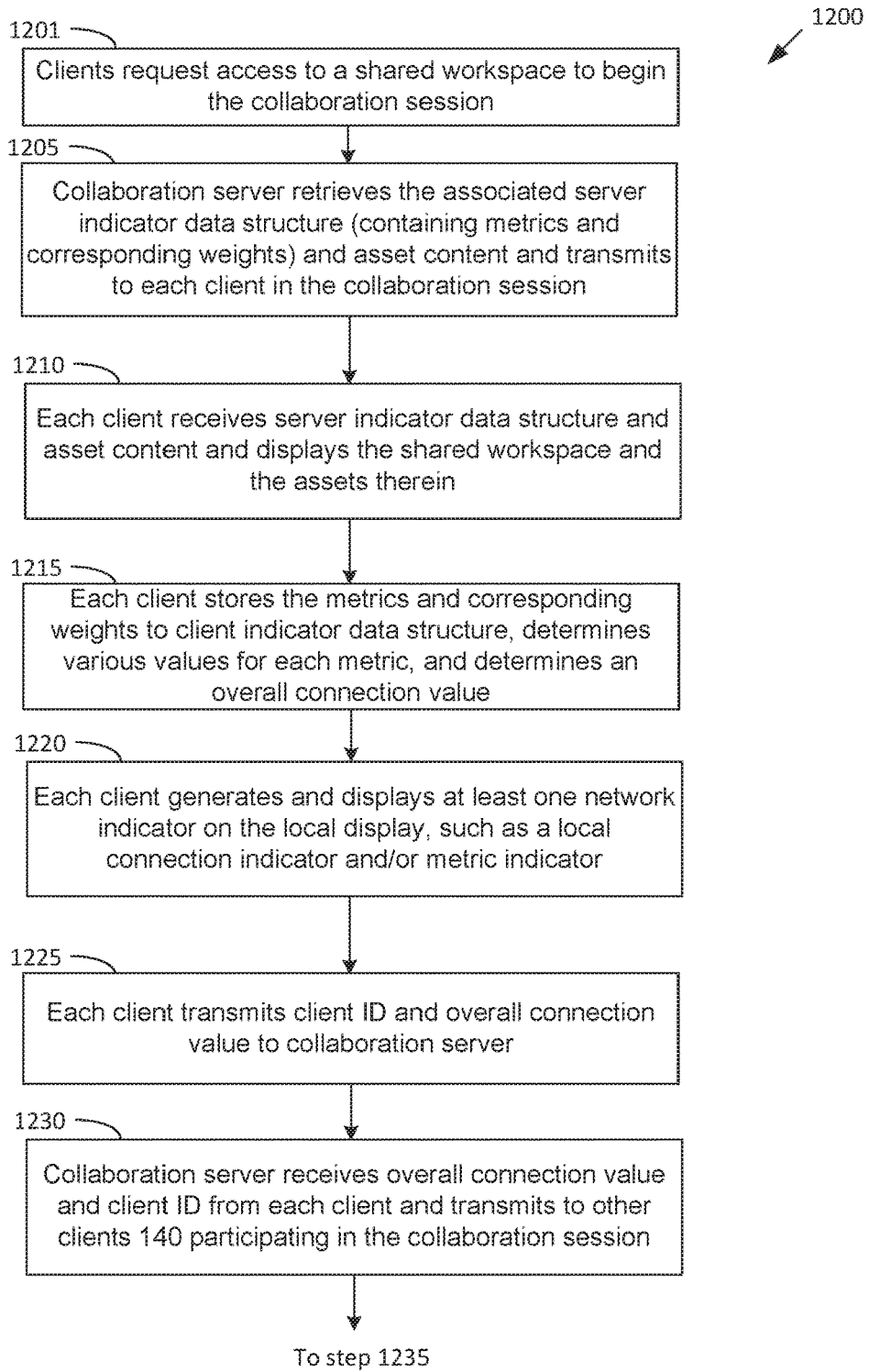
FIGS. 12A-12B set forth a flow diagram of method steps for generating one or more network indicators associated with a collaboration session, according to various embodiments of the present invention.
Figure 12B:
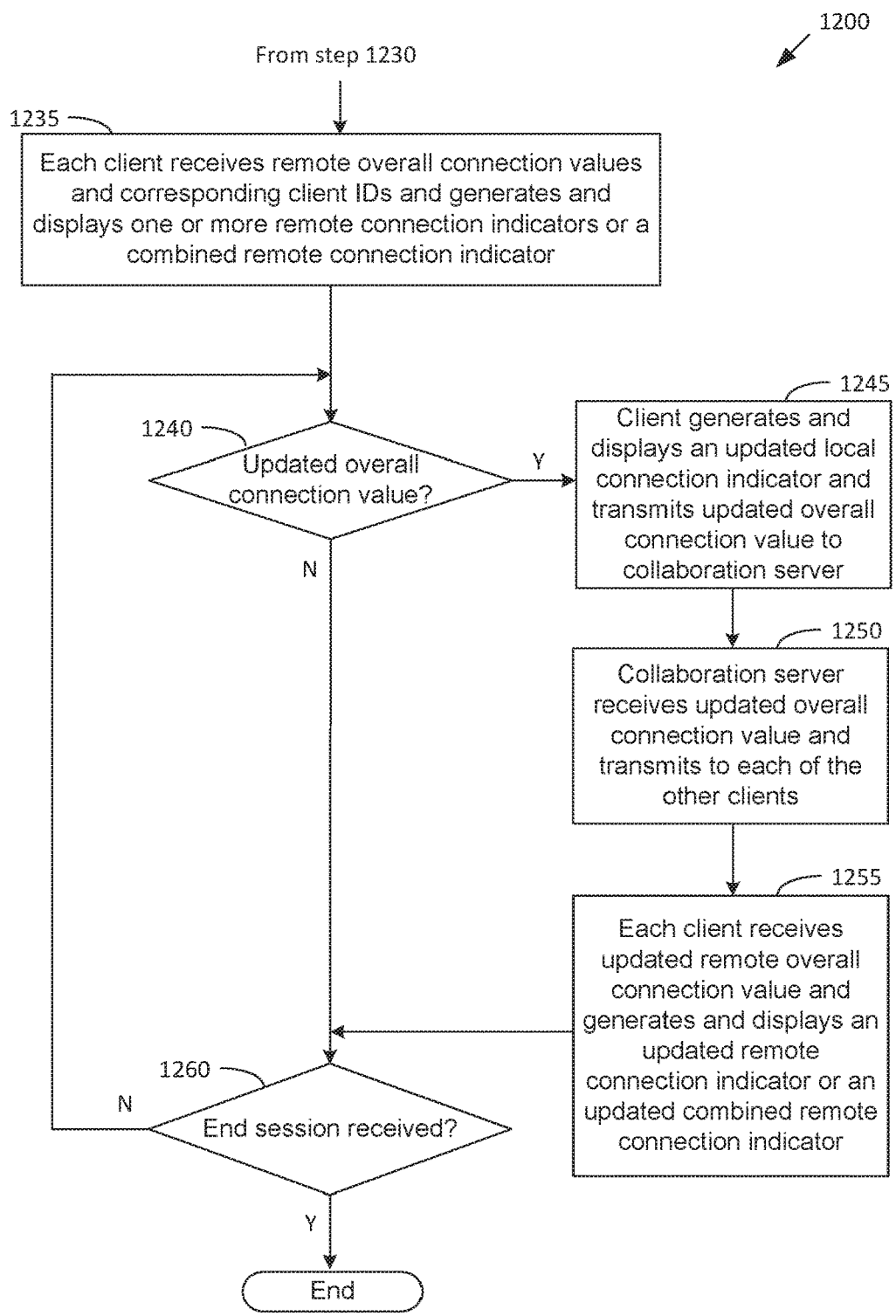

FIGS. 12A-12B set forth a flow diagram of method steps for generating one or more network indicators associated with a collaboration session, according to various embodiments of the present invention. Although the method steps are described in conjunction with the systems of FIGS. 1-10, persons skilled in the art will understand that any system configured to perform the method steps, in any order, is within the scope of the present invention. For context, in various embodiments, the collaboration server 210 (executing a server indicator engine 510) may operate in conjunction with multiple clients 140 (executing a client indicator engine 550) to perform the method steps of a method 1200 of FIGS. 12A-12B. The method 1200 may be performed during a collaboration session whereby two or more clients 140 may access and interact with a shared project and shared workspace via the collaboration server 210.

As shown, a method 1200 begins at step 1201, where a plurality of clients 140 request access to a shared workspace 502 stored on the collaboration server 210 to begin the collaboration session. For example, each client 140 may logon to the collaboration server 210 by transmitting a client ID, organization ID, and/or project ID associated with the shared workspace 502. Each client 140 may be connected to the collaboration server 210 via a separate network connection 530, each client 140 participating in the collaboration session via the separate network connection 530.

In response, the collaboration server 210 retrieves (at step 1205) a server indicator data structure 520 associated with the client ID, organization ID, project 501, and/or shared workspace 502 (e.g., retrieve from the collaboration server 310 and/or the database server 320). The collaboration server 210 may manage and maintain the server indicator data structure 520 for the shared workspace 502 during the collaboration session. The server indicator data structure 520 may comprise a first section 605 specifying a plurality of metrics 630 and a plurality of corresponding weights 640. The collaboration server 210 also retrieves (at step 1205) the asset content 331 for one or more digital assets 503 of the requested shared workspace 502 (e.g., retrieve from the file server 330). The collaboration server 210 further transmits (at step 1205) the server indicator data structure 520 and the asset content 331 for the requested shared workspace 502 to each client 140 participating in the collaboration session. At step 1210, each client 140 then receives the server indicator data structure 520 and the asset content 331 for the shared workspace 502 and displays/renders the shared workspace 502 and the assets 503 contained therein.

At step 1215, each client 140 stores the plurality of metrics 630 and plurality of corresponding weights 640 to a client indicator data structure 560, determines various values for each metric 640, and stores the determined values to the client indicator data structure 560. For example, for each metric 630, the client 140 may determine a measured value 745, normalized value 750, and weighted value 755 for the metric 630. Further, each client 140 may calculate an overall connection value 660 based on the values (such as the weighted values 755) determined for the plurality of metrics 630. Each client 140 also stores the calculated overall connection value 660 to the client indicator data structure 560. Each client 140 may continually determine (e.g., at predetermined intervals) the measured value 745, normalized value 750, and weighted value 755 for each metric 630 to update the values for each of the metrics 630. Each client 140 may also determine an updated overall connection value 660 based on the updated values for any of the metrics 630. The updated values for the metrics and the updated overall connection value 660 are also stored to the client indicator data structure 560.

At step 1220, each client 140 then generates and displays at least one network indicator on the local display 120 based on one or more values stored to the client indicator data structure 560. For example, each client 140 may generate and display a local connection indicator 801 based on the overall connection value 660, the local connection indicator 801 representing the overall quality of a network connection between the client 140 and the collaboration server 210. As another example, each client 140 may generate and display a metric indicator 802 that represents a specific metric 630 stored to the client indicator data structure 560. The metric indicator 802 may be generated based on the measured value 745, normalized value 750, and/or weighted value 755 determined for the particular metric 630. In some embodiments, the client 140 is configured to automatically generate and display a metric indicator 802 representing the metric 630 having the highest assigned weight value 640 in the client indicator data structure 560.

At step 1225, each client 140 transmits their client ID and the calculated overall connection value 660 to the collaboration server 210. At step 1230, the collaboration server 210 receives an overall connection value 660 and a corresponding client ID from each of the plurality of clients 140 participating in the collaboration session and stores to a second section 610 of the server indicator data structure 520. The collaboration server 210 also transmits the overall connection values 660 and the corresponding client IDs to each client 140 participating in the collaboration session.

At step 1235, each client 140 receives the remote overall connection values 660 and corresponding client IDs and generates and displays one or more remote connection indicators 803 on the local display 120. Each remote connection indicator 803 may represent a particular remote overall connection value 660 for a particular remote client 140. Each client 140 may also display a remote client ID adjacent to each remote connection indicator 803 to identify the remote client 140 corresponding to the remote connection indicator 803. Alternatively, at step 1235, each client 140 may generate and display a combined remote connection indicator 804 that is based on a combination of multiple remote overall connection values 660 for multiple remote clients 140.

Each client 140 then determines (at step 1240) if the overall connection value 660 has been updated due to any values for any of the metrics 630 being updated. If not, the method 1200 continues at step 1260. If so, at step 1245, the client 140 generates and displays an updated local connection indicator 801 based on the updated overall connection value 660 and transmits the updated overall connection value 660 and the client ID to the collaboration server 210.

At step 1250, the collaboration server 210 receives the updated overall connection value 660 and the client ID and stores to the second section 610 of the server indicator data structure 520. The collaboration server 210 also transmits the updated overall connection value 660 and the client ID to each of the other clients 140 participating in the collaboration session.

At step 1255, each client 140 receives the updated remote overall connection value 660 and corresponding client ID and generates and displays an updated remote connection indicator 803 representing the updated remote overall connection value 660. Alternatively, each client 140 may generate and display an updated combined remote connection indicator 804 that is based on a combination of multiple remote overall connection values 660 including the updated remote overall connection value 660.

The collaboration server 210 then determines (at step 1260) if an "end session" request is received from any client 140. If not, the method 1200 proceeds at step 1240. If so, the collaboration session and method 1200 then ends.

In sum, a collaboration server 210 transmits a server indicator data structure 520 to each client 140 in a collaboration session for a shared workspace 502. The server indicator data structure 520 comprises a first section 605 specifying a plurality of metrics 630 and a plurality of corresponding weights 640. Each client 140 receives the plurality of metrics 630 and plurality of corresponding weights 640 and determines various values (such as a measured value 745, normalized value 750, and/or weighted value 755) for each metric 640. Each client 140 also calculates an overall connection value 660 based on the plurality of weighted values 755 determined for the plurality of metrics 630. Each client 140 then generates and displays a local connection indicator 801 based on the overall connection value 660 which represents the overall quality of a network connection between the client 140 and the collaboration server 210. Each client 140 also transmits the client ID and overall connection value 660 to the collaboration server 210 which transmits to each client 140 participating in the collaboration session. Each client 140 then receives the remote overall connection values 660 and corresponding client IDs and generates and displays one or more remote connection indicators 803 based on one or more remote overall connection value 660.

At least one advantage of the disclosed technique is that a connection indicator is displayed at each client in a collaboration session that indicates an overall quality of a network connection between the client and the collaboration server. Thus, the connection indicator helps the client determine the cause of performance issues incurred during the collaboration session and to take appropriate actions to resolve the performance issues.

Another advantage of the disclosed technique is that a remote connection indicator for a remote client is displayed at a local client in a collaboration session that indicates the overall quality of the network connection between the remote client and the collaboration server. Thus, the remote connection indicator provides the local client with knowledge of any connection performance issues at the remote client.

Aspects of the subject matter described herein are set out in the following numbered clauses.

1. A computer-implemented method for generating a connection indicator associated with a collaboration session, the method comprising: retrieving, at a collaboration server, an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and transmitting the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server.

2. The computer-implemented method of clause 1, wherein each client device included in the plurality of client devices generates the connection indicator by determining a measured value and weighted value for each network connection metric included in the plurality of network connection metrics, the weighted value for each network connection metric being determined based, at least in part, on the weight corresponding to the network connection metric.

3. The computer-implemented method of any of clauses 1-2, wherein: each client device further calculates an overall connection value based on the weighted values, the overall connection value indicating the overall quality of the network connection between the client device and the collaboration server; and the connection indicator visually represents the overall connection value.

4. The computer-implemented method of any of clauses 1-3, wherein the plurality of network connection metrics comprises at least two of network latency, upload network bandwidth, download network bandwidth, web socket connection status, and order tagging.

5. The computer-implemented method of any of clauses 1-4, wherein at least one client device in the plurality of client devices further generates a first network connection metric indicator for a first network connection metric included in the plurality of network connection metrics.

6. The computer-implemented method of any of clauses 1-5, wherein the first network connection metric has a greater weight value than any other network connection metric included in the plurality of network connection metrics.

7. The computer-implemented method of any of clauses 1-6, further comprising: receiving a first overall connection value from a first client device included in the plurality of client devices, the first overall connection value indicating an overall quality of a first network connection between the first client device and the collaboration server; and transmitting the first overall connection value to a second client device included in the plurality of client devices.

8. The computer-implemented method of any of clauses 1-7, wherein the second client device generates a remote connection indicator representing the first overall connection value.

9. The computer-implemented method of any of clauses 1-8, wherein: each client device included in the plurality of client devices logs into the collaboration session using an organization identifier; and the indicator data structure is associated with the organization identifier.

10. A non-transitory computer-readable medium storing program instructions that, when executed by a processor, cause the processor to generate a connection indicator associated with a collaboration session, by performing the steps of: retrieving, at a collaboration server, an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and transmitting the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server.

11. The non-transitory computer-readable medium of clause 10, wherein each client device included in the plurality of client devices generates the connection indicator by determining a measured value and weighted value for each network connection metric included in the plurality of network connection metrics, the weighted value for each network connection metric being determined based, at least in part, on the weight corresponding to the network connection metric.

12. The non-transitory computer-readable medium of any of clauses 10-11, wherein: each client device further calculates an overall connection value based on the weighted values, the overall connection value indicating the overall quality of the network connection between the client device and the collaboration server; and the connection indicator visually represents the overall connection value.

13. The non-transitory computer-readable medium of any of clauses 10-12, wherein the plurality of network connection metrics comprises at least two of network latency, upload network bandwidth, download network bandwidth, web socket connection status, and order tagging.

14. The non-transitory computer-readable medium of any of clauses 10-13, wherein at least one client device in the plurality of client devices further generates a first network connection metric indicator for a first network connection metric included in the plurality of network connection metrics.

15. The non-transitory computer-readable medium of any of clauses 10-14, wherein the first network connection metric has a greater weight value than any other network connection metric included in the plurality of network connection metrics.

16. The non-transitory computer-readable medium of any of clauses 10-15, performing the further steps of: receiving a first overall connection value from a first client device included in the plurality of client devices and a second overall connection value from a second client device included in the plurality of client devices, the first overall connection value indicating an overall quality of a first network connection between the first client device and the collaboration server and the second overall connection value indicating an overall quality of a second network connection between the second client device and the collaboration server; and transmitting the first and second overall connection values to a third client device included in the plurality of client devices.

17. The non-transitory computer-readable medium of any of clauses 10-16, wherein the third client device included in the plurality of client devices generates a combined remote connection indicator representing a combination of the first and second overall connection values.

18. The non-transitory computer-readable medium of any of clauses 10-17, wherein the connection indicator comprises a threshold-based indicator including a plurality of different visual appearances representing a plurality of different threshold levels for the overall quality of the network connection between the client device and the collaboration server.

19. A system configured for generating a connection indicator associated with a collaboration session, the system comprising: a collaboration server comprising: a memory that includes an indicator engine; and a processor that is coupled to the memory and, upon executing the indicator engine, is configured to: retrieve an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and transmit the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server.

20. The system of clause 19, wherein at least one client device included in the plurality of client devices further generates a first network connection metric indicator representing a first network connection metric included in the plurality of metrics.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," or "engine." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for generating a connection indicator associated with a collaboration session, the method comprising:
retrieving, at a collaboration server, an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and
transmitting the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server, wherein:
each client device included in the plurality of client devices generates the connection indicator by determining a measured value and weighted value for each network connection metric included in the plurality of network connection metrics, the weighted value for each network connection metric being determined based, at least in part, on the weight corresponding to the network connection metric;

each client device further calculates an overall connection value based on the weighted values, the overall connection value indicating the overall quality of the network connection between the client device and the collaboration server; and the connection indicator visually represents the overall connection value, wherein the connection indicator comprises a threshold-based indicator including a plurality of different visual appearances representing a plurality of different threshold levels for the overall quality of the network connection between the client device and the collaboration server.

2. The computer-implemented method of claim 1, wherein at least one client device in the plurality of client devices further generates a first network connection metric indicator for a first network connection metric included in the plurality of network connection metrics.

3. The computer-implemented method of claim 2, wherein the first network connection metric has a greater weight value than any other network connection metric included in the plurality of network connection metrics.

4. The computer-implemented method of claim 1, further comprising:

receiving a first overall connection value from a first client device included in the plurality of client devices, the first overall connection value indicating an overall quality of a first network connection between the first client device and the collaboration server; and transmitting the first overall connection value to a second client device included in the plurality of client devices.

5. The computer-implemented method of claim 4, wherein the second client device generates a remote connection indicator representing the first overall connection value.

6. The computer-implemented method of claim 1, wherein the plurality of network connection metrics comprises at least two of network latency, upload network bandwidth, download network bandwidth, web socket connection status, and order tagging.

7. The computer-implemented method of claim 1, wherein:

each client device included in the plurality of client devices logs into the collaboration session using an organization identifier; and the indicator data structure is associated with the organization identifier.

8. A non-transitory computer-readable medium storing program instructions that, when executed by a processor, cause the processor to generate a connection indicator associated with a collaboration session, by performing the steps of:

retrieving, at a collaboration server, an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and transmitting the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server, wherein:

each client device included in the plurality of client devices generates the connection indicator by determining a measured value and weighted value for each network connection metric included in the plurality of network connection metrics, the weighted value for each network connection metric being determined based, at least in part, on the weight corresponding to the network connection metric;

each client device further calculates an overall connection value based on the weighted values, the overall connection value indicating the overall quality of the network connection between the client device and the collaboration server; and the connection indicator visually represents the overall connection value, wherein the connection indicator comprises a threshold-based indicator including a plurality of different visual appearances representing a plurality of different threshold levels for the overall quality of the network connection between the client device and the collaboration server.

9. The non-transitory computer-readable medium of claim 8, wherein at least one client device in the plurality of client devices further generates a first network connection metric indicator for a first network connection metric included in the plurality of network connection metrics.

10. The non-transitory computer-readable medium of claim 9, wherein the first network connection metric has a greater weight value than any other network connection metric included in the plurality of network connection metrics.

11. The non-transitory computer-readable medium of claim 8, performing the further steps of:

receiving a first overall connection value from a first client device included in the plurality of client devices and a second overall connection value from a second client device included in the plurality of client devices, the first overall connection value indicating an overall quality of a first network connection between the first client device and the collaboration server and the second overall connection value indicating an overall quality of a second network connection between the second client device and the collaboration server; and transmitting the first and second overall connection values to a third client device included in the plurality of client devices.

12. The non-transitory computer-readable medium of claim 11, wherein the third client device included in the plurality of client devices generates a combined remote connection indicator representing a combination of the first and second overall connection values.

13. The non-transitory computer-readable medium of claim 8, wherein the plurality of network connection metrics comprises at least two of network latency, upload network bandwidth, download network bandwidth, web socket connection status, and order tagging.

14. A system configured for generating a connection indicator associated with a collaboration session, the system comprising:

a collaboration server comprising:

a memory that includes an indicator engine; and a processor that is coupled to the memory and, upon executing the indicator engine, is configured to:

retrieve an indicator data structure associated with a shared workspace displayed on a plurality of client devices during the collaboration session, the indicator data structure comprising a plurality of weights for a plurality of network connection metrics, each weight in the plurality of weights corresponding to a different network connection metric in the plurality of network connection metrics; and transmit the indicator data structure to a plurality of client devices participating in the collaborative session, wherein each client device included in the plurality of client devices generates a connection indicator based, at least in part, on the indicator data structure, each connection indicator representing an overall quality of a network connection between the client device and the collaboration server, wherein:

each client device included in the plurality of client devices generates the connection indicator by determining a measured value and weighted value for each network connection metric included in the plurality of network connection metrics, the weighted value for each network connection metric being determined based, at least in part, on the weight corresponding to the network connection metric;

each client device further calculates an overall connection value based on the weighted values, the overall connection value indicating the overall quality of the network connection between the client device and the collaboration server; and the connection indicator visually represents the overall connection value, wherein the connection indicator comprises a threshold-based indicator including a plurality of different visual appearances representing a plurality of different threshold levels for the overall quality of the network connection between the client device and the collaboration server.

15. The system of claim 14, wherein at least one client device included in the plurality of client devices further generates a first network connection metric indicator representing a first network connection metric included in the plurality of metrics.

* * * * *